(12) United States Patent
Rekimoto

(10) Patent No.: US 9,262,040 B2
(45) Date of Patent: Feb. 16, 2016

(54) INFORMATION PROCESSING APPARATUS, INFORMATION PROCESSING METHOD, AND PROGRAM

(75) Inventor: Junichi Rekimoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 1104 days.

(21) Appl. No.: 12/267,846

(22) Filed: Nov. 10, 2008

(65) Prior Publication Data

US 2009/0160793 A1    Jun. 25, 2009

(30) Foreign Application Priority Data

Dec. 19, 2007  (JP) ................................ 2007-328058

(51) Int. Cl.
*G06F 3/041*    (2006.01)
*G06F 3/0481*   (2013.01)
*G06F 3/0488*   (2013.01)

(52) U.S. Cl.
CPC ............ *G06F 3/0481* (2013.01); *G06F 3/0414* (2013.01); *G06F 3/04883* (2013.01); *G06F 2203/04806* (2013.01)

(58) Field of Classification Search
USPC ......................................................... 345/173
See application file for complete search history.

(56) References Cited

U.S. PATENT DOCUMENTS

| 6,198,473 | B1 | 3/2001 | Armstrong | |
|---|---|---|---|---|
| 6,469,691 | B1 | 10/2002 | Armstrong | |
| 2004/0108992 | A1* | 6/2004 | Rosenberg | 345/156 |
| 2005/0223342 | A1* | 10/2005 | Repka | G06F 3/0481 715/851 |
| 2006/0022955 | A1* | 2/2006 | Kennedy | 345/173 |
| 2006/0132455 | A1 | 6/2006 | Rimas-Ribikauskas et al. | |
| 2006/0284858 | A1* | 12/2006 | Rekimoto | G06F 3/033 345/173 |
| 2007/0024595 | A1* | 2/2007 | Baker | G06F 3/03547 345/173 |
| 2008/0094367 | A1* | 4/2008 | Van De Ven | G06F 3/0414 345/173 |
| 2008/0120576 | A1* | 5/2008 | Kariathungal | G06F 3/04883 715/863 |

FOREIGN PATENT DOCUMENTS

| EP | 1 736 856 A2 | 12/2006 | | |
|---|---|---|---|---|
| JP | 5-241506 | 9/1993 | | |
| JP | 5-346923 | 12/1993 | | |
| JP | 6-4025 | 1/1994 | | |
| JP | 9-50235 | 2/1997 | | |
| JP | 2001-056746 | * | 2/2001 | .............. G06F 3/033 |

(Continued)

OTHER PUBLICATIONS

Nobuyuki Matsushita, et al., "HoloWall: Designing a Finger, Hand, Body, and Object Sensitive Wall", Proceedings of UIST'97, 1997, pp. 209-210.

(Continued)

*Primary Examiner* — Kathy Wang-Hurst
*Assistant Examiner* — Douglas Wilson
(74) *Attorney, Agent, or Firm* — Oblon, McClelland, Maier & Neustadt, L.L.P.

(57) ABSTRACT

An information processing apparatus includes a pressure detecting unit for detecting a magnitude of a contacting pressure of a contacted object with respect to an input device operated when physically contacted by the contacted object; and a changing unit for changing a display region displayed on a display device of predetermined information to be displayed on the display device according to an output signal output from the input device at a speed corresponding to the magnitude of the contacting pressure detected by the pressure detecting unit.

14 Claims, 37 Drawing Sheets

(56) References Cited

FOREIGN PATENT DOCUMENTS

| | | |
|---|---|---|
| JP | 2001-56746 | 2/2001 |
| JP | 2003-337649 | 11/2003 |
| JP | 2005-339420 | 12/2005 |
| JP | 2006-268073 | 10/2006 |
| JP | 2006-345209 | 12/2006 |

OTHER PUBLICATIONS

Jun Rekimoto, et al. "Perceptual Surfaces: Towards a Human and Object Sensitive Interactive Display", SmartSkin: An Infrastructure for Freehand Manipulations on Interactive Surfaces CH12002, 2002, 3 pages.

* cited by examiner

TOUCH

PRESSURIZE

RELEASE

DRAG (NO PRESSURIZATION)

DRAG (WITH PRESSURIZATION)

ENLARGE

REDUCE

UPPER SCROLL

LOWER SCROLL

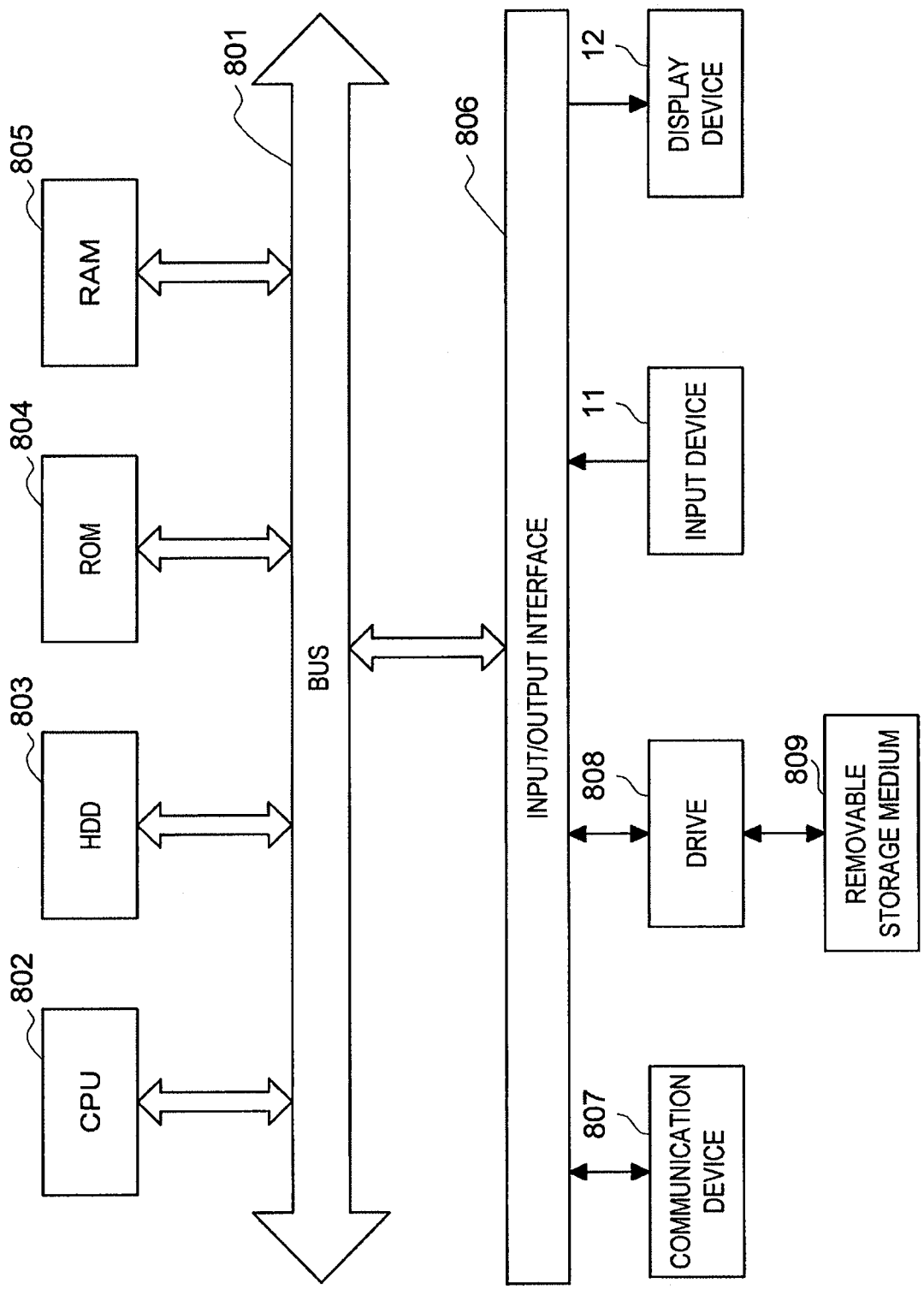

INFORMATION PROCESSING APPARATUS, INFORMATION PROCESSING METHOD, AND PROGRAM

CROSS REFERENCES TO RELATED APPLICATIONS

The present invention contains subject matter related to Japanese Patent Application JP 2007-328058 filed in the Japan Patent Office on Dec. 19, 2007, the entire contents of which being incorporated herein by reference.

BACKGROUND OF THE INVENTION

1. Field of the Invention

The present invention relates to an information processing apparatus, an information processing method, and a program.

2. Description of the Related Art

With development of recent information techniques, various information processing apparatuses capable of displaying predetermined information of PDA (Personal Data Assistant), portable telephone, music reproduction device, personal computer, display device, and the like are being developed, and needs of the user putting importance on portability thereof is rapidly increasing. The information processing apparatus is becoming miniaturized in order to respond to the needs of the user.

According to the miniaturized information processing apparatus, a display screen such as a monitor for displaying the predetermined information is also miniaturized. In such compact screen, the information that can be displayed all at once and the visibility of displayed information are limited by themselves when browsing various contents such as contents, maps, pictures, text data, table calculation data, sentence data, and illustration data on the Web. Thus, in such information processing apparatuses, operation for changing the scale and the scroll of the content (display target) is frequently carried out.

An input device which is operated by detecting the contacting position of the finger or the like of the user and which outputs a predetermined signal such as a touch panel and an input device described in Japanese Patent Application Laid-Open No. 2003-337649 is developed, and a technique of changing the scale and the scroll with such input device is developed. Among them, the changing (scrolling) of the displayed position (range) in the content is a scrolling operation generally carried out in a GUI (Graphical User Interface), and methods such as a method by a scroll bar, and a method of dragging one point on the screen while pressing the point with a mouse, a finger, a touch pen, or the like are often used. A method of specifying the magnification with a menu, a method by a magnification scroll bar, and the like are often used to change (scaling) the display magnification of the displayed content.

However, such scaling operations have low intuitive performance for the user compared to the scrolling operation carried out by directly dragging the screen, and thus becomes a cause the operability of the information processing apparatus is unable to be enhanced.

As described in Nobuyuki Matsushita and Jun Rekimoto, "HoloWall: Designing a Finger, Hand, Body, and Object Sensitive Wall", Proceedings of UIST'97, 1997; and Jun Rekimoto, SmartSkin: An Infrastructure for Freehand Manipulations on Interactive Surfaces CHI2002, 2002, an information processing apparatus capable of, through the use of an input device (multi-touch interface) capable of recognizing (multi-touch) the operation point (e.g., touch position in the touch panel) to be operated by the user not at one point but at two or more points, controlling scaling according to the distance between two points is developed. Such information processing apparatus can adjust scaling by opening and closing of two fingers or the like touching the input device.

SUMMARY OF THE INVENTION

However, a user interface capable of being operated with one hand as in portable telephone is often desired for mobile equipments or the like, which place importance on portability. The operation with two fingers is difficult in the operation with one hand (e.g., operation by a thumb). Even in other equipments other than such mobile equipment, operating with two fingers, two arms, and the like (particularly operating the two fingers or the like in different directions) is not easy, and further enhancement in operability is desired for users who are familiar with the concept of one operation point.

An information processing apparatus (input device) capable of being operated with one finger is disclosed in Japanese Patent Application Laid-Open No. 2006-345209. This information processing apparatus changes the enlargement percentage to a value corresponding to the magnitude of contacting pressure. That is, the magnification increases when pressed strongly and the magnification returns when the finger is released. When changing the reduction percentage, the reduction percentage is changed by changing and pressing the contacting area of the finger. According to such information processing apparatus, operation with one finger is possible and enhancement of a constant operability is achieved, but users desire development of an information processing apparatus in which the operability is further enhanced.

In other words, even in the information processing apparatus described in Japanese Patent Application Laid-Open No. 2006-345209, it is difficult to move in an enlarged state or to release the finger and pay close attention to the content being enlarged, and furthermore, it is not easy to fine tune the enlargement percentage as fine tuning of the pressing force of the finger becomes necessary. It is sometimes also difficult for the user to switch between enlargement and reduction as the contacting area of the finger varies between individuals. Thus, an information display device with enhanced operability than that of Japanese Patent Application Laid-Open No. 2006-345209 capable of being intuitively operated by the user and capable of satisfying both scrolling and scaling is desired.

In view of solving the above issues, the present invention desirably provides a novel and improved information processing apparatus capable of operating both scrolling and scaling with one operation point and capable of further enhancing the operability, an information processing method, and a program.

According to an embodiment of the present invention, there is provided an information processing apparatus including a pressure detecting unit for detecting a magnitude of a contacting pressure of a contacted object with respect to an input device operated when physically contacted by the contacted object; and a changing unit for changing a display region displayed on a display device of predetermined information to be displayed on the display device according to an output signal output from the input device at a speed corresponding to the magnitude of the contacting pressure detected by the pressure detecting unit.

According to such configuration, the magnitude of the contacting pressure of the contacted object can be detected by the pressure detecting unit, and the display region displayed on the display device of the predetermined information can be changed at a speed corresponding to the magnitude by the changing unit. Thus, the display region can be changed with only the contact of one contacted object, and the speed of changing the display region can be adjusted by adjusting the contacting pressure.

The changing unit may change the display region by changing a display magnification of the predetermined information or moving a display range of the predetermined information.

The changing unit may increase a speed of changing the display magnification of the predetermined information according to increase in the magnitude of the contacting pressure detected by the pressure detecting unit when changing the display magnification of the predetermined information.

A position detecting unit for detecting a contacting position of the contacted object with respect to the input device; and a first mode switching unit for switching between an enlargement mode of changing an enlargement percentage of the predetermined information and a reduction mode of changing a reduction percentage according to the movement of the contacting position detected by the position detecting unit may be further arranged; wherein the changing unit changes the enlargement percentage or the reduction percentage according to the mode switched by the first mode switching unit.

According to such configuration, the contacting position of the contacted object can be detected by the position detecting unit. The first mode switching unit can switch between the enlargement mode and the reduction mode. In this case, the first mode switching unit switches the mode according to the movement of the contacting position detected by the position detecting unit. Thus, similar to when changing the display region, the mode can be switched with only the contact of one contacted object.

The changing unit may increase a speed of moving the display range according to increase in the magnitude of the contacting pressure detected by the pressure detecting unit when changing the display range of the predetermined information.

A position detecting unit for detecting a contacting position of the contacted object with respect to the input device; and a second mode switching unit for switching between a one direction mode of moving the display range to one side and an other direction mode of moving the display range to the other side according to the contacting position or the movement of the contacting position detected by the position detecting unit may be further arranged; wherein the changing unit moves the display range to one side or the other side according to the mode switched by the second mode switching unit.

According to such configuration, the second mode switching unit can switch between the one direction mode and the other direction mode. In this case, the second mode switching unit switches the mode according to the contacting position or the movement of the contacting position detected by the position detecting unit. Thus, similar to when changing the display region, the mode can be switched with only the contact of one contacted object.

A position detecting unit for detecting a contacting position of the contacted object with respect to the input device; and a third mode switching unit for switching between a magnification mode of changing the display magnification of the predetermined information and a movement mode of moving the display range of the predetermined information according to the contacting position or the movement of the contacting position detected by the position detecting unit may be further arranged; wherein the changing unit may change the display magnification or move the display range according to the mode switched by the third mode switching unit.

According to such configuration, the third mode switching unit can switch between the magnification mode and the movement mode. In this case, the third mode switching unit switches the mode according to the contacting position or the movement of the contacting position detected by the position detecting unit. Thus, similar to when changing the display region, the mode can be switched with only the contact of one contacted object.

According to another embodiment of the present invention, there is provided an information processing method including the steps of: detecting a magnitude of a contacting pressure of a contacted object with respect to an input device operated by being physically contacted by the contacted object; and changing a display region displayed on a display device of predetermined information to be displayed on the display device according to an output signal output from the input device at a speed corresponding to the magnitude of the detected contacting pressure.

According to such configuration, the display region can be changed with only the contact of one contacted object, and the speed of changing the display region can be adjusted by adjusting the contacting pressure.

According to another embodiment of the present invention, there is provided a program for causing a computer to execute the procedures of: detecting a magnitude of a contacting pressure of a contacted object with respect to an input device operated by being physically contacted by the contacted object; and changing a display region displayed on a display device of predetermined information to be displayed on the display device according to an output signal output from the input device at a speed corresponding to the magnitude of the contacting pressure detected by a pressure detecting unit.

According to such configuration, the display region can be changed with only the contact of one contacted object, and the speed of changing the display region can be adjusted by adjusting the contacting pressure.

According to the embodiments of the present invention described above, both scrolling and scaling can be operated from one operation point, and the operability can be further enhanced.

BRIEF DESCRIPTION OF THE DRAWINGS

FIG. 30 is an explanatory view for explaining a configuration example of a computer for realizing a series of processes by executing a program.

DETAILED DESCRIPTION OF THE PREFERRED EMBODIMENTS

Figure 1:
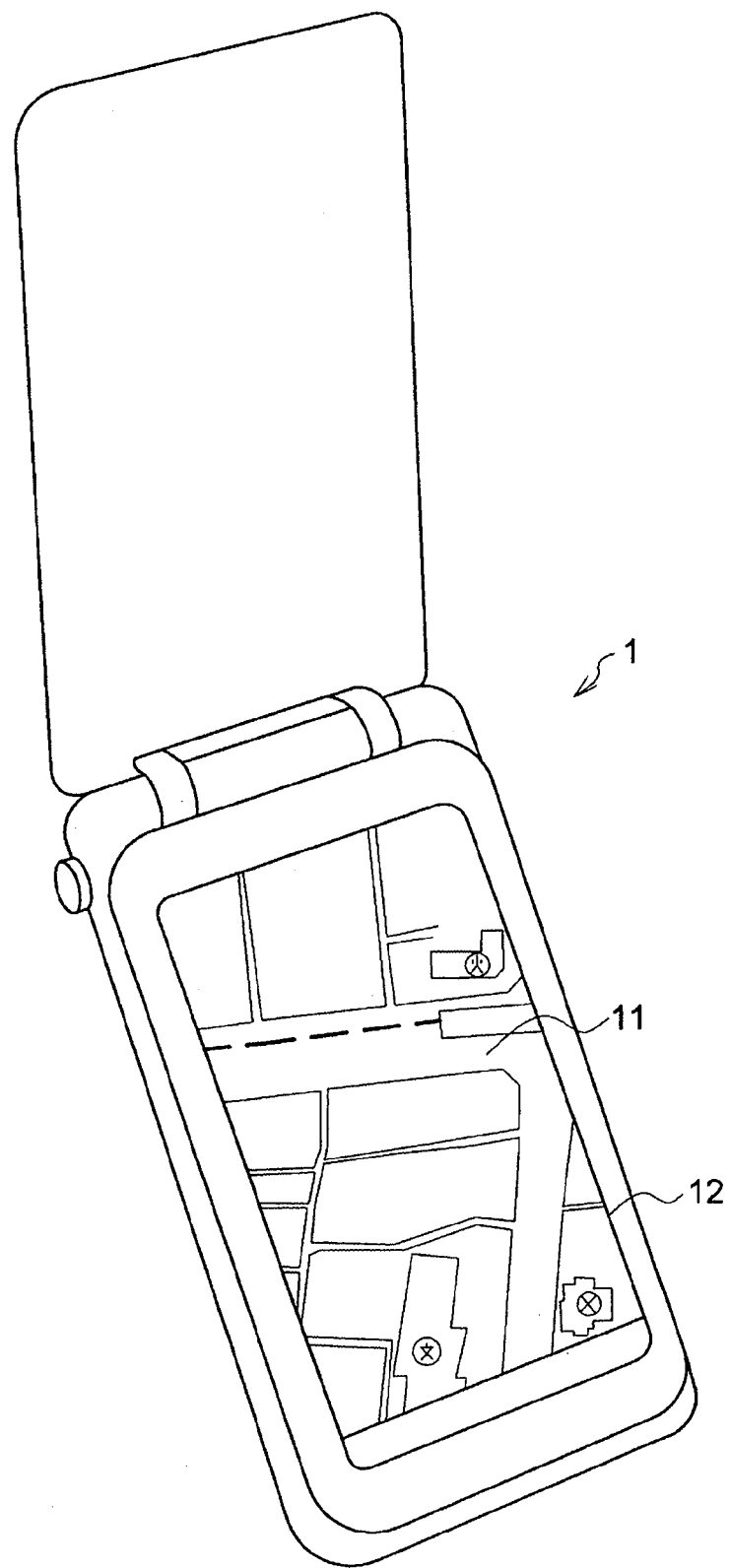
FIG. 1 is an explanatory view for explaining one example of an equipment to be applied with each embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

<Outline of Information Processing Apparatus>

An information processing apparatus according to each embodiment of the present invention can be applied to various equipments. The equipments to be applied include PDA, portable telephone, music reproduction device, computer, display device, white board, projector, digital camera, digital video camera, and the like capable of displaying predetermined information. However, the equipments to be applied with each embodiment of the present invention is not limited thereto, and each embodiment of the present invention can be applied to various equipments capable of displaying predetermined information and changing the display state by the operation of the user. A case in which an information processing apparatus to be applied with each embodiment of the present invention is applied to a PDA 1 shown in FIG. 1 will be described below for the sake of convenience of explanation. FIG. 1 is an explanatory view for explaining one example of an equipment to be applied with each embodiment of the present invention.

The equipment to be applied with the information processing apparatus according to each embodiment of the present invention includes an input device and a display device. It should be noted that the phrase "equipment includes an input device and a display device" includes a case where the input device and the display device are simply connected to the equipment.

The input device is operated by having the user physically contact a contacted object such as one part of the body including finger and a predetermined tool including a touch pen, and outputs a predetermined output signal according to the operation. More specifically, the input device converts a contacting position of the contacted object and a magnitude of a contacting pressure (pressure) of the contacted object and outputs the same. The input device thus includes a contact sensor and a pressure sensor.

The contact sensor may be a touch sensor, a touch panel, a touch screen, a touch pad and the like including matrix switch, resistance film switch, surface elastic wave switch, and the like.

The pressure sensor may be a pressure sensor using piezoelectric element, pressure-electric resistance conversion element, force sensing resistor (FSR), solid state relay (SSR), and the like.

In other words, in such input device, the contact sensor of touch sensor, touch panel, touch screen, touch pad, or the like is arranged on the front surface, and the pressure sensor is arranged to detect the physical pressure applied on the contact sensor. The contact sensor and the pressure sensor respectively convert the contacting position and the contacting pressure to an electric signal and output the same. Such input device is also described in Japanese Patent Application Laid-Open No. 2006-345209, Japanese Patent Application Laid-Open No. 2005-317041, Japanese Patent Application Laid-Open No. 2003-223265, and the like.

The display device is controlled by the information processing apparatus corresponding to the predetermined output signal output from the input device, and displays predetermined information (hereinafter also referred to as "content").

The display device may be a cathode ray tube (CRT), a liquid crystal display (LCD), a plasma display panel (PDP), a field emission display (FED), an organic electroluminescence display (organic EL, OELD), a video projector, or the like.

The input device and the display device may be integrally formed as in a touch screen, or may be formed as separate bodies as in a combination of a touch pad and a monitor. The PDA 1, which is one example of equipment applied with the information processing apparatus according to each embodiment of the present invention, will be described below as including a touch screen in which an input device 11 and a display device 12 are integrally formed as shown in FIG. 1.

The information processing apparatuses according to a first embodiment to a fourth embodiment of the present invention will be first described, and then the information processing apparatuses according to a fifth embodiment to a seventh embodiment of the present invention will be described.

The information processing apparatuses according to the first embodiment to the fourth embodiment change a display region displayed on the display device 12 in a content as a display state of the display device 12 at a speed corresponding to the contacting pressure on the input device 11 of the contacted object. The display region refers to the information displayed on the display device 12 of the information contained in the content. That is, if the content is map data, for example, the entire map data is not necessarily displayed on the display device 12, and one part of the map data may be displayed. In this case, the displayed information of the map data corresponds to the display region of the content. More specifically, the information processing apparatuses according to the first embodiment and the second embodiment change the display region by changing the display magnification (enlargement percentage or reduction percentage) of the content, and the information processing apparatuses according to the third embodiment and the fourth embodiment change the display region by moving the displayed range (display range) of the content.

The information processing apparatuses according to the fifth embodiment to the seventh embodiment change the display region to be described in the first embodiment to the fourth embodiment with one operation point (e.g., one finger or the like).

The information processing apparatuses according to the first embodiment to the seventh embodiment have one part of the configuration common and one part of the operation common, and thus the configuration and the operation different from other embodiments will be described in each embodiment, and the description on the common configuration and operation will be omitted.

The information processing apparatus according to each embodiment will be sequentially described below.

First Embodiment

Figure 2:
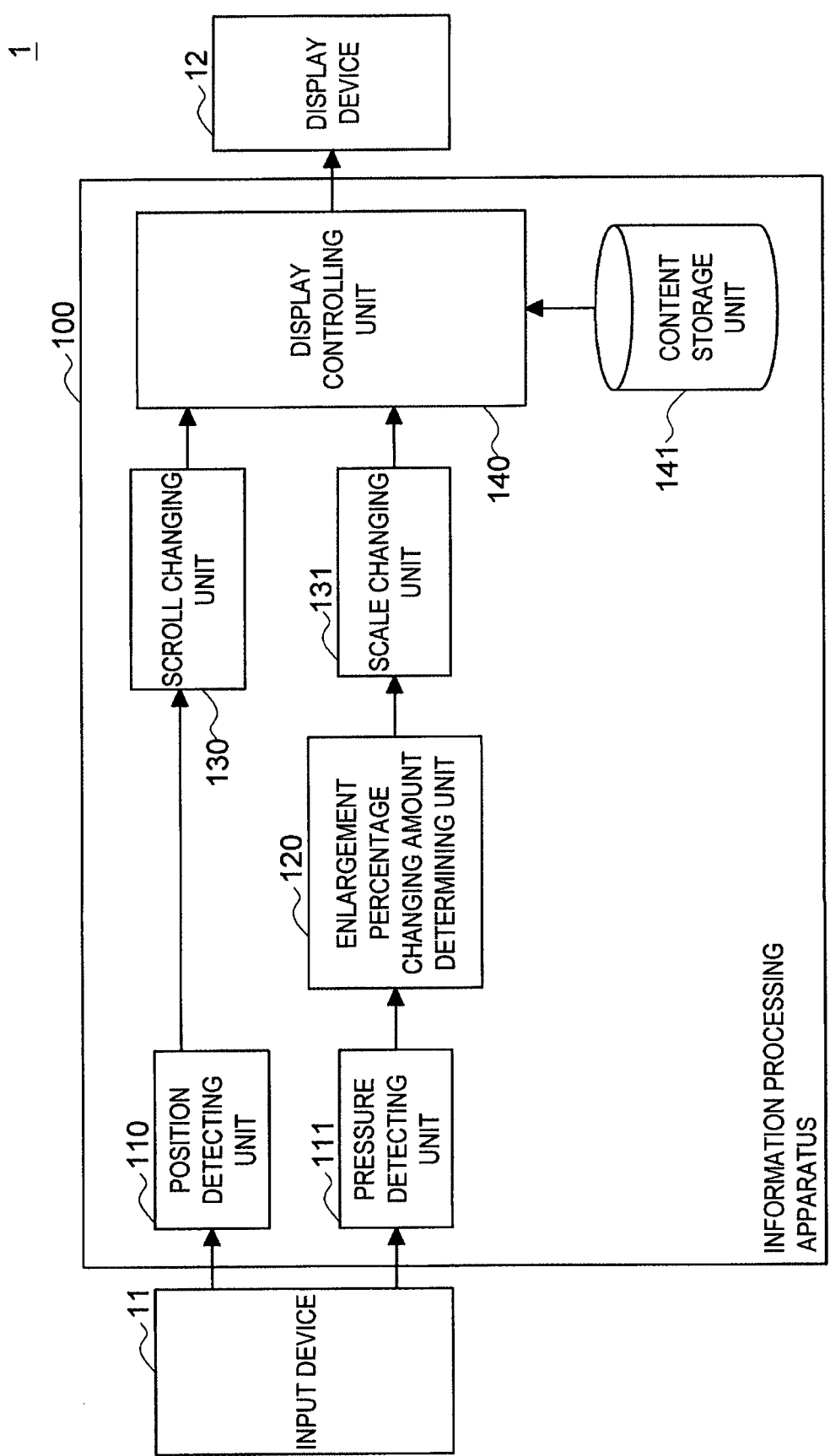
FIG. 2 is an explanatory view for explaining a configuration of an information processing apparatus according to a first embodiment of the present invention.
Figure 3A:
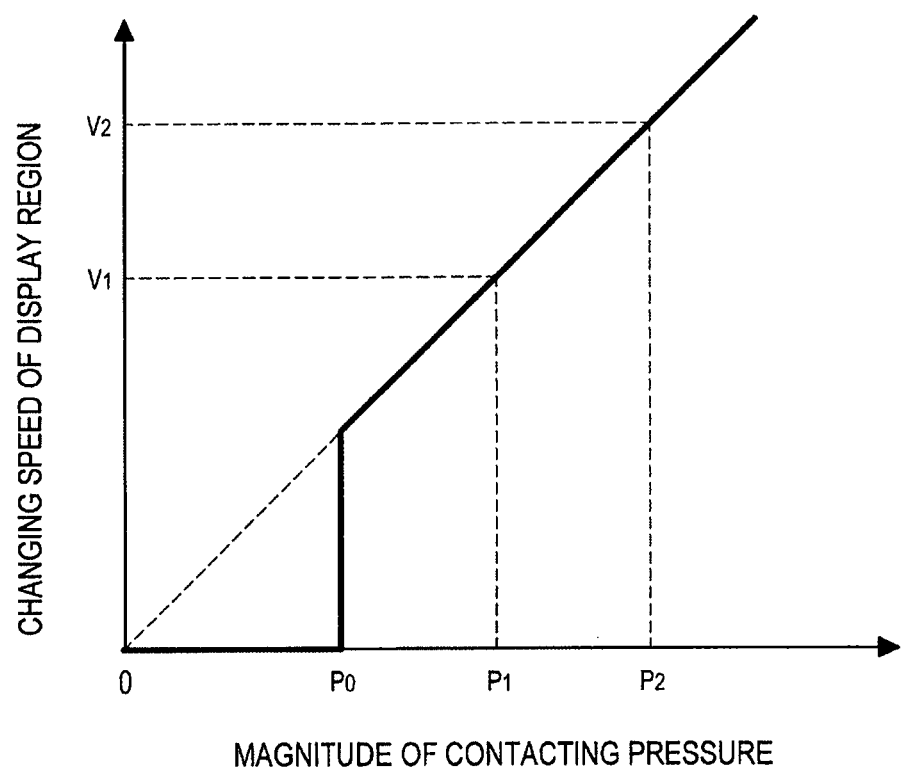
FIG. 3A is an explanatory view for explaining a relationship between the changing amount in the display region by the information processing apparatus according to the embodiment and the magnitude of the contacting pressure.
Figure 3B:
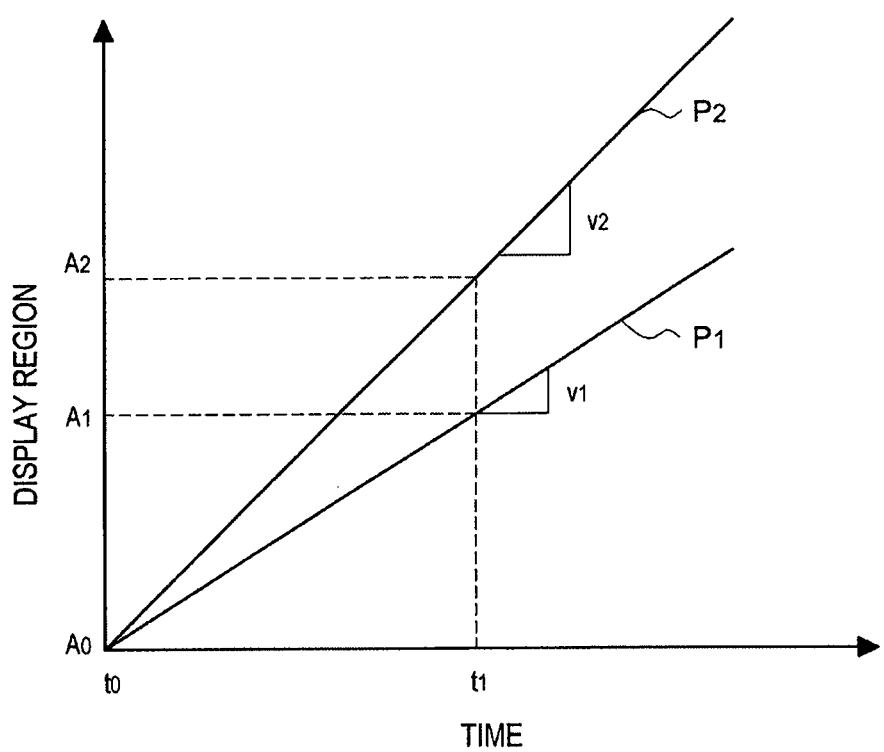
FIG. 3B is an explanatory view for explaining a relationship between the changing amount in the display region by the information processing apparatus according to the embodiment and the magnitude of the contacting pressure.
Figure 4:
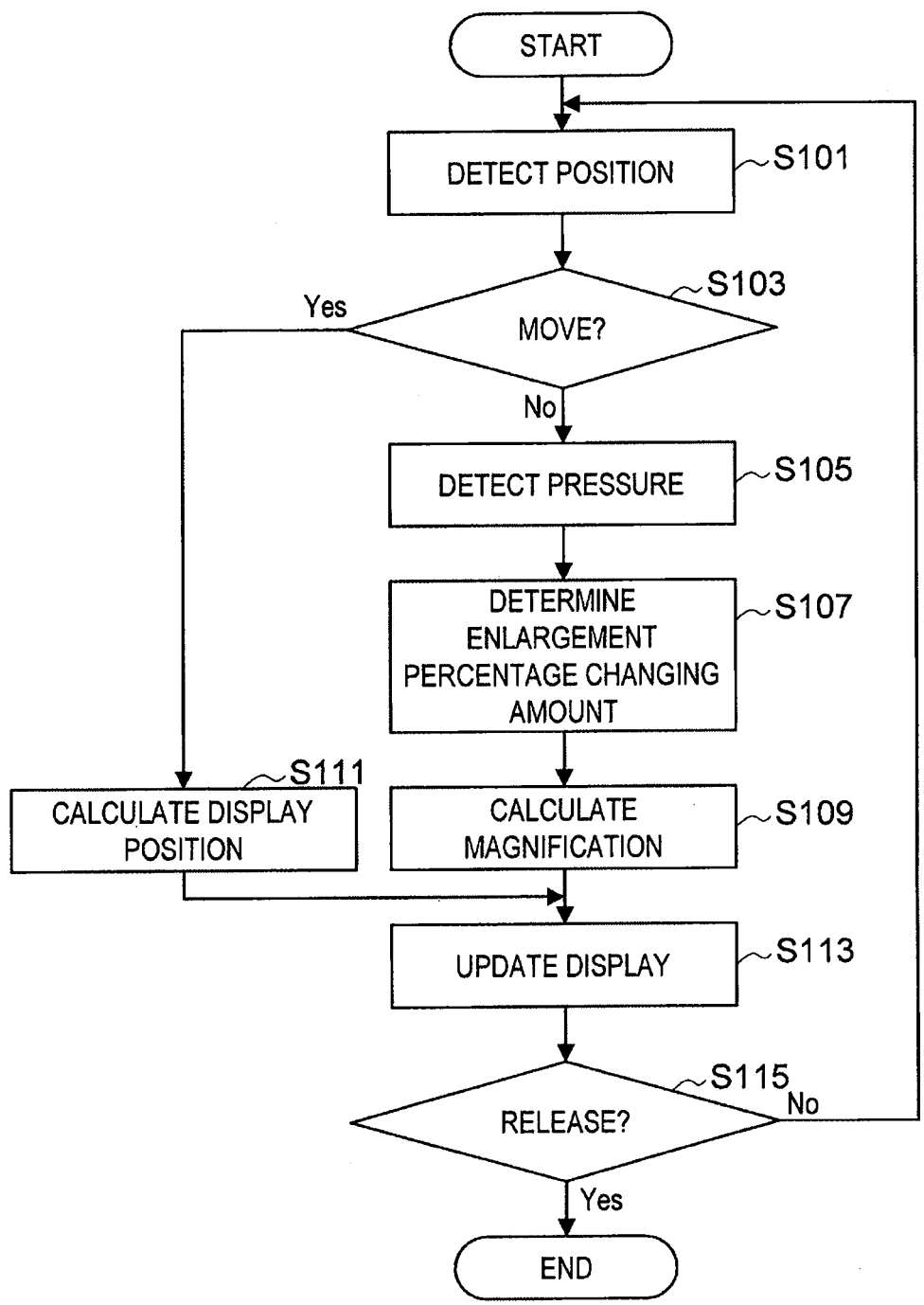
FIG. 4 is an explanatory view for explaining an operation of the information processing apparatus according to the embodiment.
Figure 6:
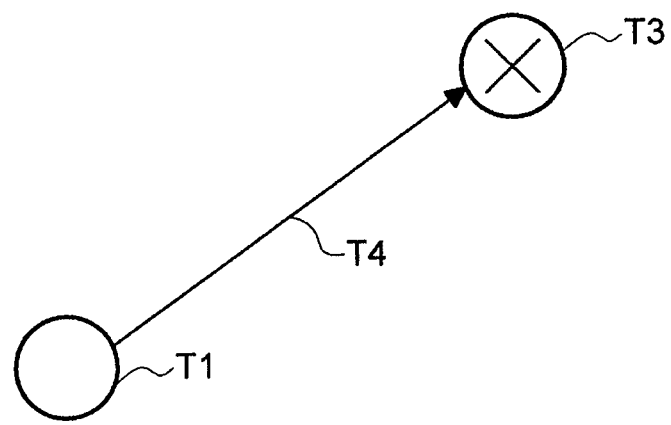
FIG. 6 is an explanatory view for explaining a scrolling operation in the information processing apparatus according to the embodiment.
Figure 7A:
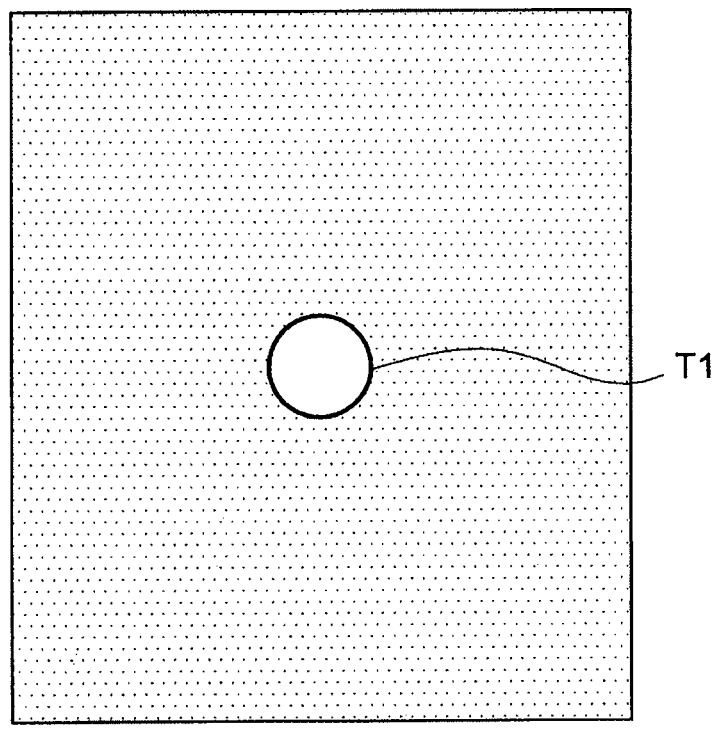
FIG. 7A is an explanatory view for explaining a scaling operation in the information processing apparatus according to the embodiment.
Figure 7B:
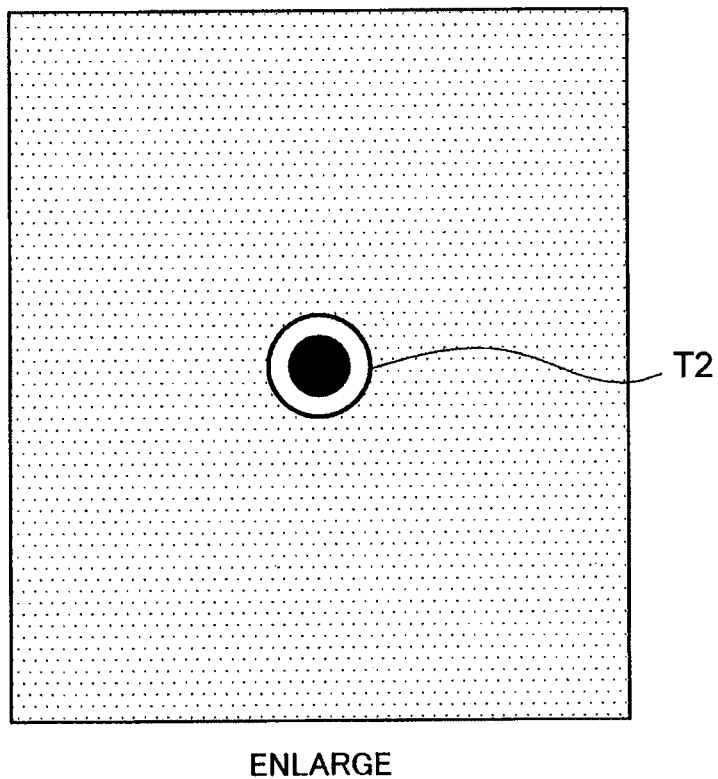
FIG. 7B is an explanatory view for explaining a scaling operation in the information processing apparatus according to the embodiment.
Figure 7C:
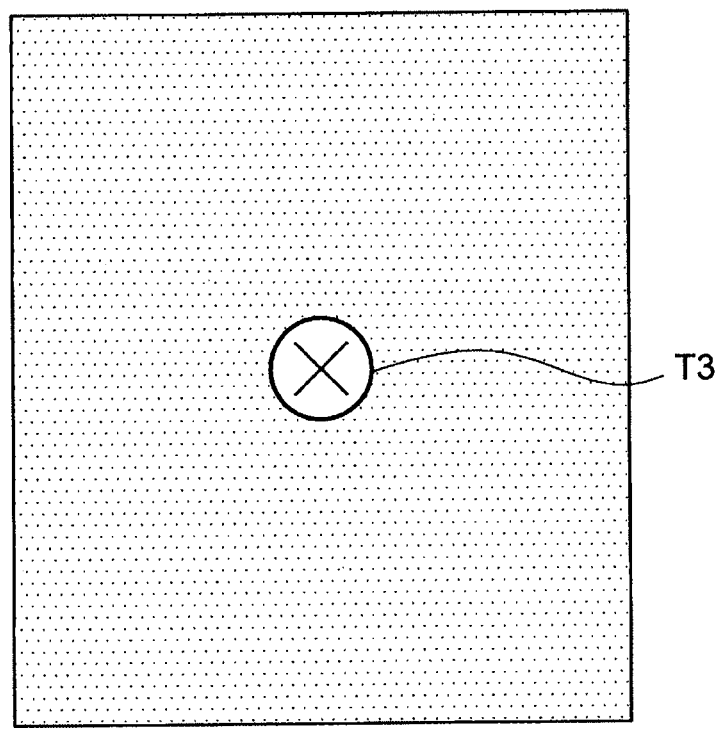
FIG. 7C is an explanatory view for explaining a scaling operation in the information processing apparatus according to the embodiment.

First, an information processing apparatus according to the first embodiment of the present invention will be described with reference to FIGS. 2 to 7C. FIG. 2 is an explanatory view for explaining a configuration of an information processing apparatus according to the present embodiment. FIGS. 3A and 3B are explanatory views for describing a relationship between the changing amount in the display region by the information processing apparatus according to the present embodiment and the magnitude of the contacting pressure. FIG. 4 is an explanatory view for explaining an operation of the information processing apparatus according to the present embodiment. FIGS. 5A to 5E are explanatory views explaining a notation for describing the operation of the user. FIG. 6 is an explanatory view for explaining a scrolling operation in the information processing apparatus according to the present embodiment. FIGS. 7A to 7C are explanatory views for describing a scaling operation in the information processing apparatus according to the present embodiment.

(Configuration)

As shown in FIG. 2, the PDA 1 further includes an information processing apparatus 100 according to the first embodiment of the present invention in addition to the input device 11 and the display device 12. The information processing apparatus 100 includes a position detecting unit 110, a pressure detecting unit 111, an enlargement percentage changing amount determining unit 120, a scroll changing unit 130, a scale changing unit 131, a display controlling unit 140, and a content storage unit 141.

The content storage unit 141 is recorded with one or more contents, and the display controlling unit 140 acquires at least one content recorded in the content storage unit 141 and displays the content on the display device 12.

In this case, the display controlling unit 140 displays on the display device 12 the content contained within a display range set by the scroll changing unit 130 at a display magnification set by the scale changing unit 131.

The display range referred to herein refers to the range of information displayed on the display device 12 of the information contained in the content. The display magnification refers to the magnification of when displaying the information contained in the display range of the content on the display device 12. Therefore, the size of the display range is determined by the display magnification, as well as the screen size, the resolution, and the like of the display device 12. Furthermore, the display region to be displayed on the display device 12 of the content is determined by determining the position of the display range.

The position detecting unit 110 is connected to the input device 11, and acquires an electric signal which is converted from the contacting position of the contacted object by the contact sensor of the input device 11 and output therefrom. The position detecting unit 110 detects (specifies) the contacting position of the contacted object, and outputs a signal corresponding to the relevant position. The position detecting unit 110 also outputs a signal representing change in time of the contacting position, that is, the trajectory the contacting position has moved (speed of movement of the contacting position, may be continuous or discontinuous).

The scroll changing unit 130 is an example of a changing unit which sets the display range. The scroll changing unit 130 moves the display range with the movement of the contacting position detected by the position detecting unit 110. More specifically, the scroll changing unit 130 moves the display range in the direction and at a speed corresponding to the direction and the speed of the movement speed of the contacting position detected by the position detecting unit 110. That is, if the content is map data, the scroll changing unit 130 sets which range of the information contained in the map data to display on the display device 12. The scroll changing unit 130 then moves the range with the movement of the contacting position.

The pressure detecting unit 111 is connected to the input device 11, and acquires an electric signal which is converted from the contacting pressure of the contacted object by the pressure sensor of the input device 11 and output therefrom. The pressure detecting unit 111 detects (specifies) the magnitude (pressure value) of the contacting pressure of the contacted object, and outputs a pressure signal corresponding to the relevant pressure value. The pressure detecting unit 111 may continuously or periodically detect the magnitude of the contacting pressure, and detect the time change of the magnitude.

The enlargement percentage changing amount determining unit 120 acquires the pressure signal output from the pressure detecting unit 111, and determines the changing amount of the enlargement percentage according to the magnitude of the contacting pressure represented by the pressure signal. The enlargement percentage referred to herein refers to the display magnification of the content displayed on the display device 12. The changing amount of the enlargement percentage represents the changing amount when changing the enlargement percentage, that is, the speed of changing the enlargement percentage. In this case, the enlargement percentage changing amount determining unit 120 increases the changing amount of the enlargement percentage according to increase in the magnitude of the contacting pressure detected by the pressure detecting unit.

One example of a relationship between increase in magnitude of the contacting pressure and increase in the changing amount (changing speed) of the enlargement percentage (display region) is shown in FIG. 3A. As shown in FIG. 3A, the enlargement percentage changing amount determining unit 120 increases the changing amount (changing speed) of the enlargement percentage (display region) with increase in the magnitude of the contacting pressure.

More specifically, the enlargement percentage changing amount determining unit 120 determines the changing amount (changing speed) of the enlargement percentage (display region) to 0 when the magnitude of the contacting pressure is smaller than P0. That is, when the magnitude of the contacting pressure is smaller than P0, the enlargement percentage changing amount determining unit 120 does not change the enlargement percentage. This is to distinguish the other operations such as dragging and the changing of magnification by pressurization.

The enlargement percentage changing amount determining unit 120 determines the changing amount (changing speed) to V1 corresponding to P1 when the magnitude of the contacting pressure is P1. The enlargement percentage changing amount determining unit 120 determines the changing amount (changing speed) to V2 corresponding to P2 when the magnitude of the contacting pressure increases and becomes P2.

The scale changing unit 131 is an example of a changing unit which sets the display magnification of when the display controlling unit 140 displays the content, and changes the display magnification at the changing amount determined by the enlargement percentage changing amount determining unit 120 to change the display region. In this case, since the enlargement percentage changing amount determining unit 120 determines the changing amount (speed) corresponding to the magnitude of the contacting pressure as described above, the scale changing unit 131 changes the display magnification (enlargement percentage herein) at the changing amount (speed) corresponding to the magnitude of the contacting pressure. That is, the scale changing unit 131 increases the changing amount (speed) of the display magnification according to the increase in the magnitude of the contacting pressure when the magnitude of the contacting pressure is increased.

One example of time change of the enlargement percentage (display region) is shown in FIG. 3B.

For instance, when the user presses the input device 11 at the contacting pressure of P1 from a state in which the enlargement percentage (display region) is set at A0, the changing amount (speed) becomes V1 as shown in FIG. 3A. When the user continues to push the input device 11 at the contacting pressure of P1 during time t0 to t1, the enlargement percentage (display region) is changed at the changing amount (speed) of V1 and becomes A1. For instance, when the user presses the input device 11 at the contacting pressure of P2 larger than P1 from a state in which the enlargement percentage (display region) is set at A0, the changing amount (speed) becomes V2 which is larger than V1 as shown in FIG. 3A. When the user continues to push the input device 11 at the contacting pressure of P2 during time t0 to t1, the enlargement percentage (display region) is changed at the changing amount (speed) of V1 and becomes A2 which is larger than A1.

That is, the enlargement percentage (display region) is changed at a faster speed when the user presses the input device 11 at a strong pressure, and the enlargement percentage (display region) is changed at a slower speed when the user presses the input device 11 at a weak pressure.

(Operation)

The operation of the information processing apparatus 100 according to the present embodiment will now be described with reference to FIG. 4. As shown in FIG. 4, when the user touches the input device 11, step S101 is processed, and the position detecting unit 110 of the information processing apparatus 110 detects the contacting position. The process then proceeds to step S103, and the position detecting unit 110 determines whether or not the contacting position is moved. The process proceeds to step S111 if the contacting position is moved and the process proceeds to step S105 if the contacting position is not moved.

If the contacting position is not moved, the pressure detecting unit 111 detects the magnitude of the contacting pressure in step S105. The process then proceeds to step S107, and the enlargement percentage changing amount determining unit 120 determines and outputs the changing amount of the enlargement percentage corresponding to the magnitude of the contacting pressure. The process then proceeds to step S109, and the scale changing unit 131 adds the changing amount determined in step S107 to the set enlargement percentage to calculate the display magnification (i.e., enlargement percentage), and changes the display magnification to be used when the display controlling unit 140 displays the content. The process then proceeds to step S113.

If the contacting position is moved, the scroll changing unit 130 moves the display range according to the movement of the contacting position in step S111. The process then proceeds to step S113.

In step S113, the display controlling unit 140 updates the display of the content on the display device 12 based on the display magnification changed in step S109 or the display range moved in step S111. The process then proceeds to step 115, and the position detecting unit 110 checks whether or not the touching by the user is released, that is, whether or not the contacted object is not contacted. The operation is terminated if the contacted object is not contacting (if released), and the processes after step S101 are again repeated if the contacted object is contacting.

The above-described operation will be described below centering on the operation of the user to explain the operability of the user. Before making such explanation, the notation for describing the operation by the user will be described with reference to FIGS. 5A to 5E.

Figure 5A:
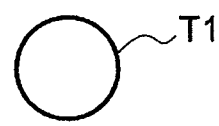
FIG. 5A is an explanatory view for explaining a notation for describing the operation of the user.

A symbol T1 shown in FIG. 5A indicates the position where the user touched the touch screen of the input device 11. That is, the symbol T1 indicates the contacting start position of the contacted object.

Figure 5B:
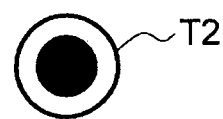
FIG. 5B is an explanatory view for explaining a notation for describing the operation of the user.

A symbol T2 shown in FIG. 5B indicates the touch position when the user presses the input device 11, that is, when the magnitude of the contacting pressure exceeds P0 shown in FIG. 3A. That is, the symbol T2 indicates that the touch screen has been pressurized.

Figure 5C:
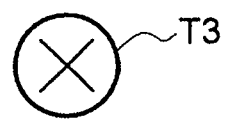
FIG. 5C is an explanatory view for explaining a notation for describing the operation of the user.

A symbol T3 shown in FIG. 5C indicates a position (release position) where the user released the contact on the input device 11.

Figure 5D:
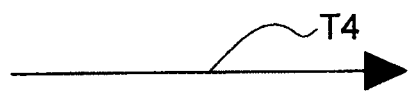
FIG. 5D is an explanatory view for explaining a notation for describing the operation of the user.

A symbol T4 (arrow) shown in FIG. 5D indicates the trajectory of the movement of the contacting position when the user drags the input device 11 while touching and without pressurization. That is, the symbol T4 indicates the movement of the contacting position of the contacted object.

Figure 5E:
FIG. 5E is an explanatory view for explaining a notation for describing the operation of the user.

A symbol T5 (arrow) shown in FIG. 5E indicates the trajectory of the movement of the contacting position when the user drags the input device 11 with pressurization. That is, the symbol T5 also indicates the movement of the contacting position of the contacted object.

Representing the scrolling operation by the user with such notation, FIG. 6 is obtained.

That is, as shown in FIG. 6, the contacted object contacts the touch screen at the position of the symbol T1, the contacted object is dragged in the direction of the symbol T2, and the contacted object is released at the position of the symbol T3. When such operation is performed, step S101, step S103, step S111, step S113, and step S115 of the operations shown in FIG. 4 are sequentially processed, and the operation is terminated. Through such operation, the information processing apparatus 100 moves the display range to be displayed on the display device 12 of the content, and changes the display region. That is, the information processing apparatus 100 scrolls the content with the trajectory corresponding to the symbol T4.

Representing the scaling operation by the user, FIGS. 7A to 7C are obtained.

In other words, as shown in FIG. 7A, the contacted object contacts the touch screen at the position of the symbol T1, and at such position, the contacting pressure by the contacted object is increased and the touch screen is pressed as indicated by the symbol T2 of FIG. 7B. The contacted object is released at the position of the symbol T3 as shown in FIG. 7C. When such operation is operated, step S101, step S103, step S105, step S107, step S109, step S113, and step S115 of the operations shown in FIG. 4 are sequentially processed, and the operation is terminated. Through such operation, the information processing apparatus 100 changes the enlargement percentage to be displayed on the display device 12 of the content at the changing amount (changing speed, see e.g., FIG. 3A) corresponding to the magnitude of the contacting pressure. That is, the information processing apparatus 100 enlarges the content at the changing amount corresponding to the magnitude of the contacting pressure indicated by the symbol T2.

(Example of Effects)

The information processing apparatus 100 according to the present embodiment has been described. According to such information processing apparatus 100, the user can drag the input device 11 to scroll the content and the user can press the input device 11 to change (zoom-in) the enlargement percentage at the changing amount corresponding to the pressure, that is, the magnitude of the contacting pressure of the contacted object. Thus, the user can operate not only scrolling but also scaling with one finger, and can control the speed of changing the scale by the pressing force. Therefore, the operability can be enhanced with the information processing apparatus 100 according to the present embodiment.

Second Embodiment

Figure 8:
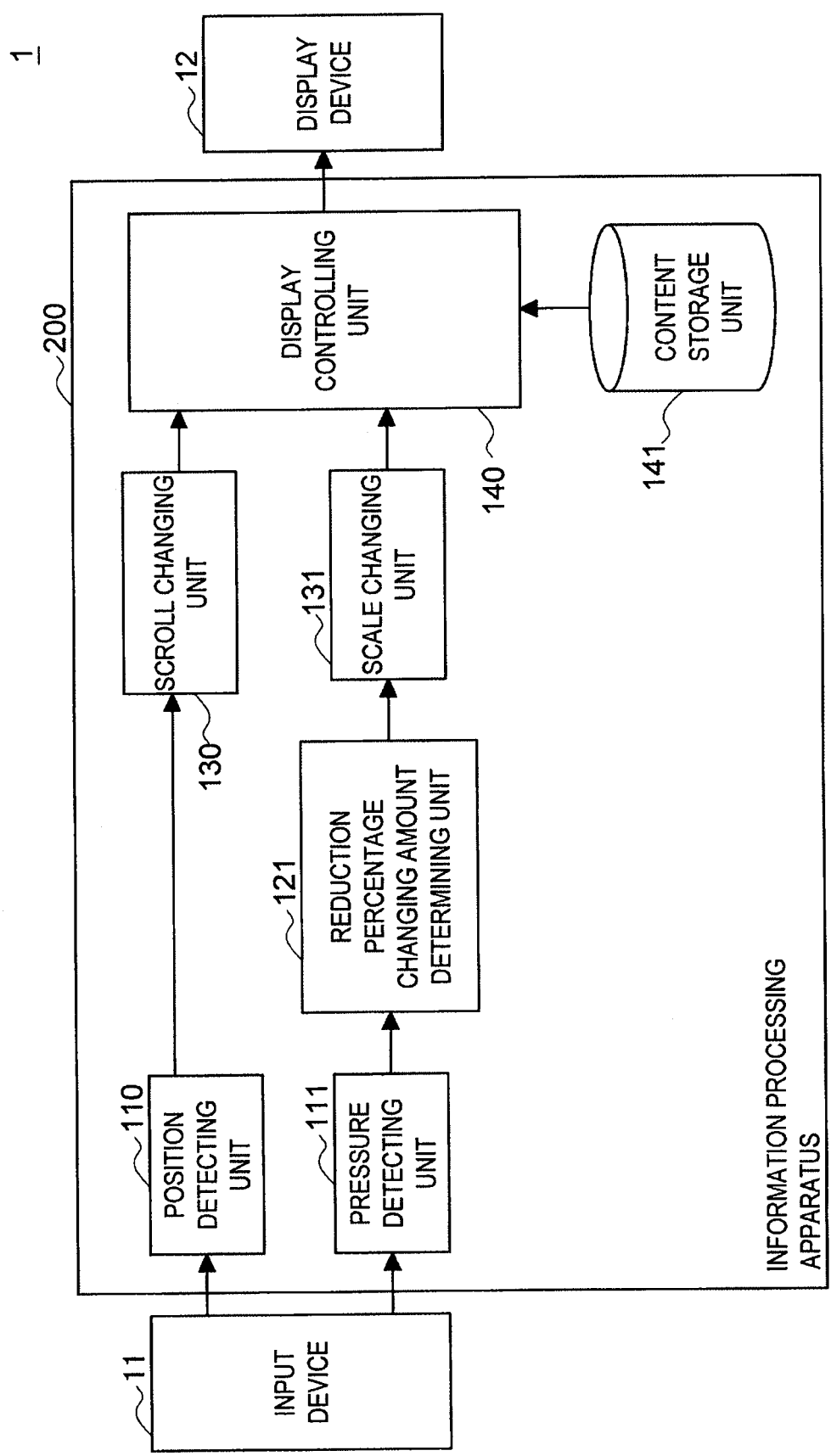
FIG. 8 is an explanatory view for explaining a configuration of an information processing apparatus according to a second embodiment of the present invention.
Figure 9:
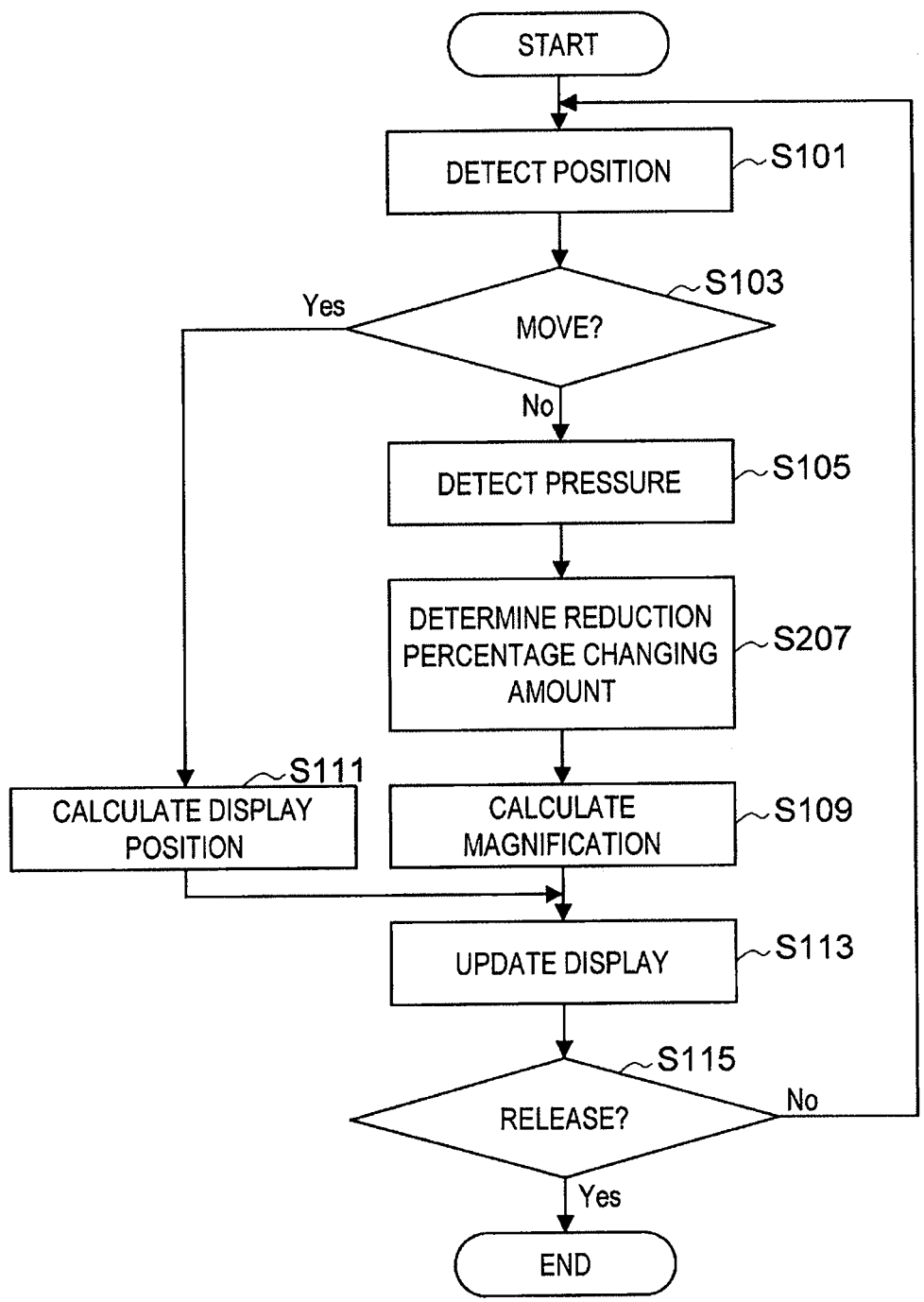
FIG. 9 is an explanatory view for explaining an operation of the information processing apparatus according to the embodiment.
Figure 10:
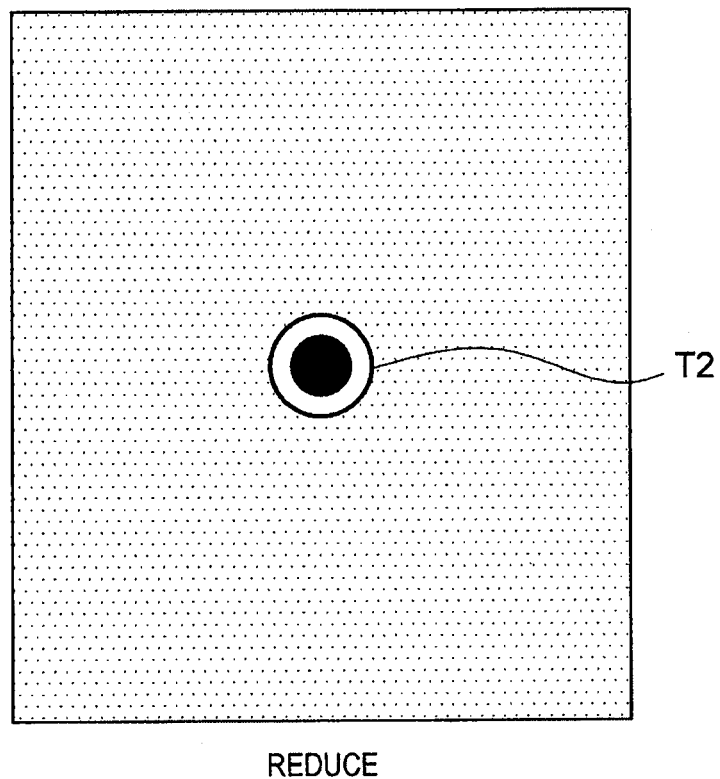
FIG. 10 is an explanatory view for explaining a scaling operation in the information processing apparatus according to the embodiment.

An information processing apparatus according to a second embodiment of the present invention will now be described with reference to FIGS. 7A and 7C, FIGS. 8 to 10. FIG. 8 is an explanatory view for explaining a configuration of the information processing apparatus according to the present embodiment. FIG. 9 is an explanatory view for explaining an operation of the information processing apparatus according to the present embodiment. FIG. 10 is an explanatory view for explaining a scaling operation in the information processing apparatus according to the present embodiment. The information processing apparatus 100 according to the first embodiment changes the enlargement percentage at the changing amount corresponding to the magnitude of the contacting pressure. The information processing apparatus according to the present embodiment similarly changes the reduction percentage.

(Configuration)

As shown in FIG. 8, the information processing apparatus 200 according to the present embodiment includes a reduction percentage changing amount determining unit 121 in place of the enlargement percentage changing amount determining unit 120 of the information processing apparatus 100 according to the first embodiment. Other configurations of the information processing apparatus 200 according to the present embodiment are the same as the other configurations of the information processing apparatus 100 according to the first embodiment.

The reduction percentage changing amount determining unit 121 acquires the pressure signal output from the pressure detecting unit 111, and determines the changing amount of the reduction percentage according to the magnitude of the contacting pressure represented by the pressure signal. The reduction percentage referred to herein refers to the display magnification of the content displayed on the display device 12. The changing amount of the reduction percentage represents the changing amount when changing the reduction percentage, that is, the speed of changing the reduction percentage. In this case, the reduction percentage changing amount determining unit 121 increases the changing amount of the reduction percentage according to increase in the magnitude of the contacting pressure detected by the pressure detecting unit. The displayed content is reduced faster by increasing the changing amount of the reduction percentage.

Similar to the enlargement percentage according to the first embodiment, the reduction percentage changing amount determining unit 121 also increases the changing amount (changing speed) of the reduction percentage (display region) with increase in the magnitude of the contacting pressure, as shown in FIG. 3A.

More specifically, the reduction percentage changing amount determining unit 121 determines the changing amount (changing speed) of the reduction percentage (display region) to 0 when the magnitude of the contacting pressure is smaller than P0. That is, when the magnitude of the contacting pressure is smaller than P0, the reduction percentage changing amount determining unit 121 does not change the enlargement percentage. This is to distinguish the other operations such as dragging and the changing of magnification by pressurization.

The reduction percentage changing amount determining unit 121 determines the changing amount (changing speed) to V1 corresponding to P1 when the magnitude of the contacting pressure is P1. The reduction percentage changing amount determining unit 121 determines the changing amount (changing speed) to V2 corresponding to P2 when the magnitude of the contacting pressure increases and becomes P2.

The scale changing unit 131 changes the display magnification at the changing amount determined by the reduction percentage changing amount determining unit 121 to change the display region. In this case, since the reduction percentage changing amount determining unit 121 determines the changing amount (speed) corresponding to the magnitude of the contacting pressure as described above, the scale changing unit 131 changes the display magnification (reduction percentage herein) at the changing amount (speed) corresponding to the magnitude of the contacting pressure. That is, the scale changing unit 131 increases the changing amount (speed) of the display magnification according to the increase in the magnitude of the contacting pressure when the magnitude of the contacting pressure is increased.

One example of time change of the reduction percentage (display region) is as shown in FIG. 3B.

For instance, when the user presses the input device 11 at the contacting pressure of P1 from a state in which the display magnification (display region) is set at A0, the changing amount (speed) becomes V1 as shown in FIG. 3A. When the user continues to push the input device 11 at the contacting pressure of P1 during time t0 to t1, the reduction percentage (display region) is changed at the changing amount (speed) of V1 and becomes A1. For instance, when the user presses the input device 11 at the contacting pressure of P2 larger than P1 from a state in which the reduction percentage (display region) is set at A0, the changing amount (speed) becomes V2 which is larger than V1 as shown in FIG. 3A. When the user continues to push the input device 11 at the contacting pressure of P2 during time t0 to t1, the reduction percentage (display region) is changed at the changing amount (speed) of V1 and becomes A2 which is larger than A1.

That is, the reduction percentage (display region) is changed at a faster speed when the user presses the input device 11 at a strong pressure, and the reduction percentage (display region) is changed at a slower speed when the user presses the input device 11 at a weak pressure.

(Operation)

The operation of the information processing apparatus 200 according to the present embodiment will now be described with reference to FIG. 9. The operation of the information processing apparatus 200 is basically the same as the operation of the information processing apparatus 100 according to the first embodiment. The process of step S207 is performed in place of the process of step S107 shown in FIG. 4.

In other words, in step S207, the reduction percentage changing amount determining unit 121 determines and outputs the changing amount of the reduction percentage corresponding to the magnitude of the contacting pressure. In the following process of step S109, the scale changing unit 131 adds the changing amount determined in step S207 to the set reduction percentage to calculate the display magnification (i.e., reduction percentage), and changes the display magnification to be used when the display controlling unit 140 displays the content. Other operations by the information processing apparatus 200 according to the present embodiment are the same as the operations of the information processing apparatus 100 according to the first embodiment, and thus the description thereof will be omitted.

Representing the scaling operation by the user in the information processing apparatus 200 according to the present embodiment, FIGS. 7A, 10, and 7C are obtained.

In other words, as shown in FIG. 7A, the contacted object contacts the touch screen at the position of the symbol T1, and at such position, the contacting pressure by the contacted object is increased and the touch screen is pressed as indicated by the symbol T2 of FIG. 10. The contacted object is released at the position of the symbol T3 as shown in FIG. 7C. When such operation is operated, step S101, step S103, step S105, step S207, step S109, step S113, and step S115 of the operations shown in FIG. 9 are sequentially processed, and the operation is terminated. Through such operation, the information processing apparatus 200 changes the reduction percentage to be displayed on the display device 12 of the content at the changing amount (changing speed, see e.g., FIG. 3A) corresponding to the magnitude of the contacting pressure. That is, the information processing apparatus 200 reduces the content at the changing amount corresponding to the magnitude of the contacting pressure indicated by the symbol T2.

(Example of Effects)

The information processing apparatus 200 according to the present embodiment has been described. According to such information processing apparatus 200, the user can drag the input device 11 to scroll the content and the user can press the input device 11 to change (zoom-out) the reduction percentage at the changing amount corresponding to the pressure, that is, the magnitude of the contacting pressure of the contacted object. Thus, the user can operate not only scrolling but also scaling with one finger, and can control the speed of changing the scale by the pressing force. Therefore, the operability can be enhanced with the information processing apparatus 200 according to the present embodiment, similar to the information processing apparatus 100 according to the first embodiment.

Third Embodiment

Figure 11:
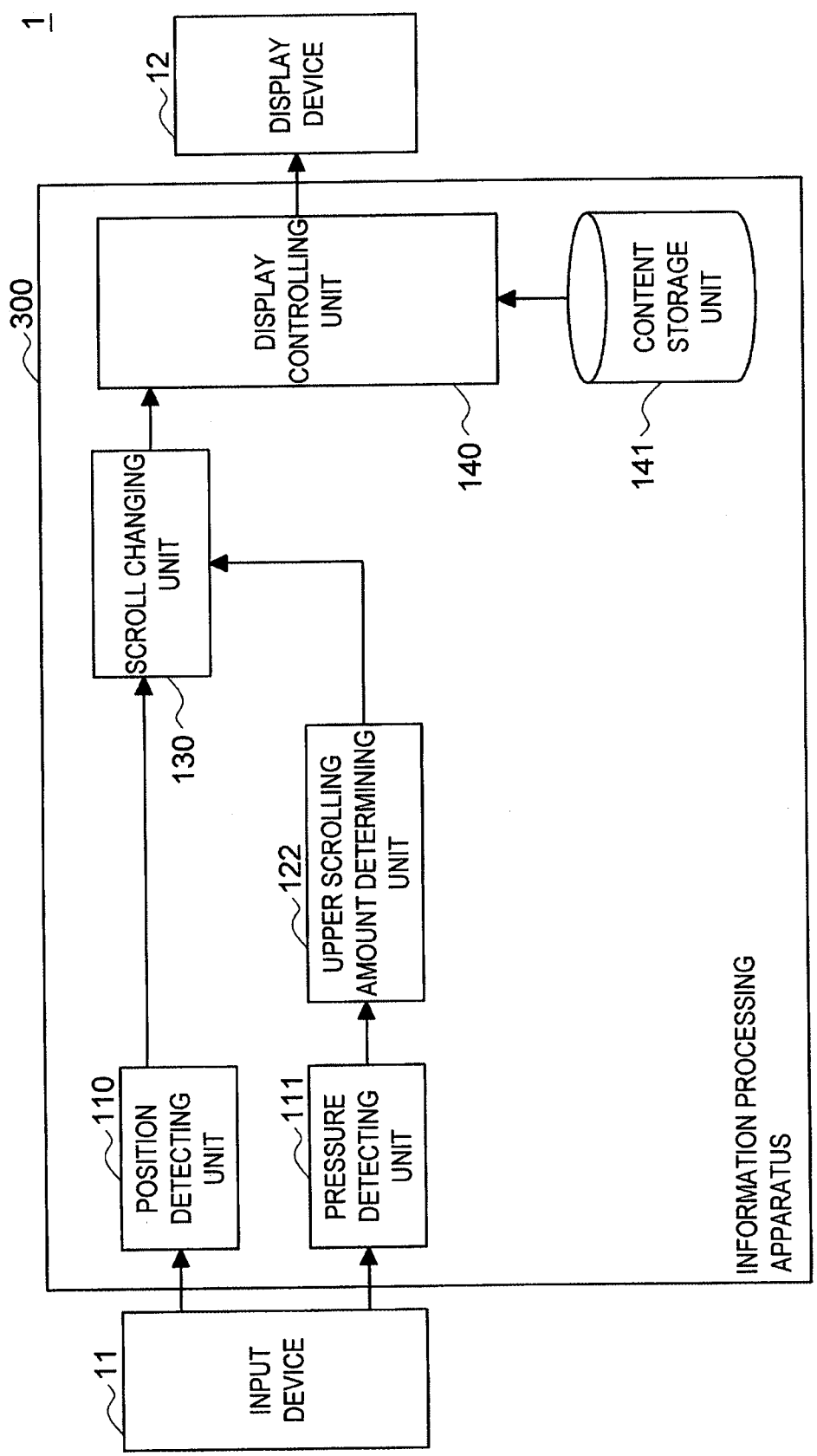
FIG. 11 is an explanatory view for explaining a configuration of an information processing apparatus according to a third embodiment of the present invention.
Figure 12:
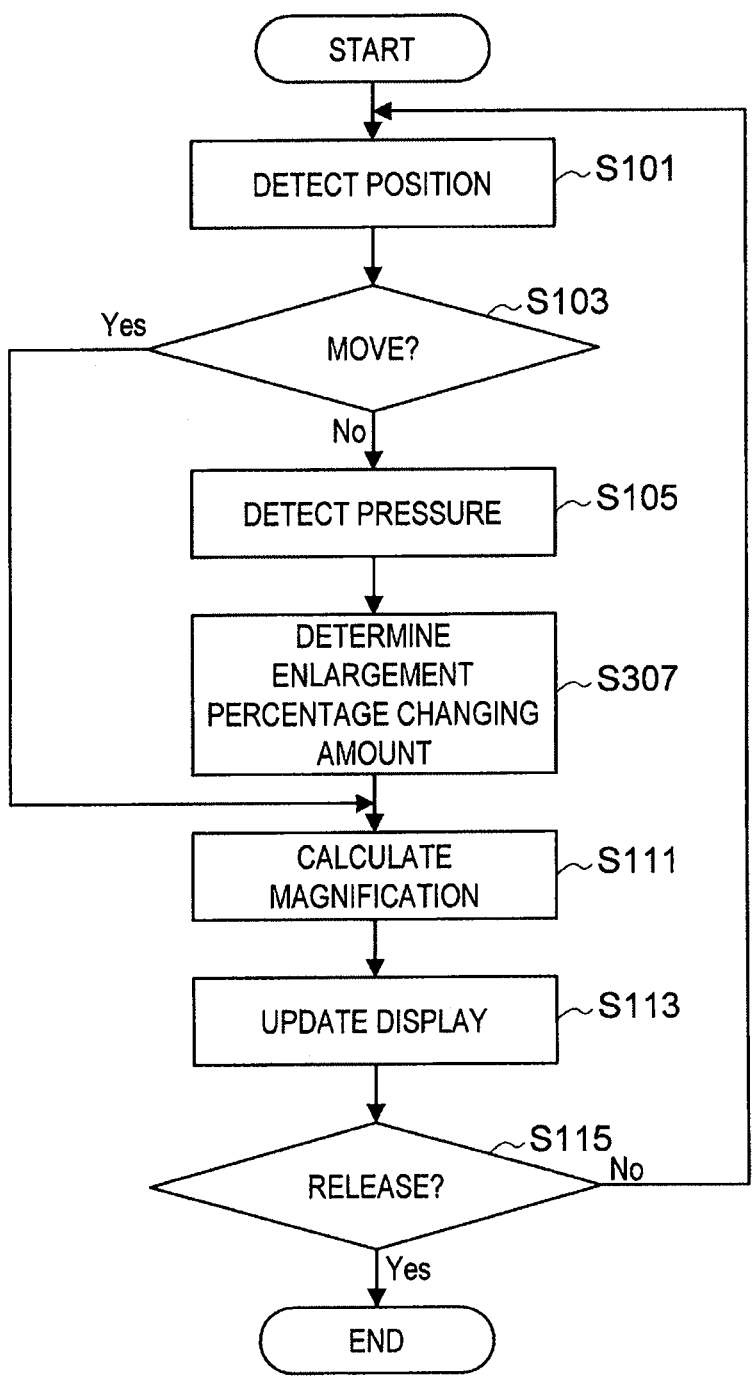
FIG. 12 is an explanatory view for explaining an operation of the information processing apparatus according to the embodiment.
Figure 13:
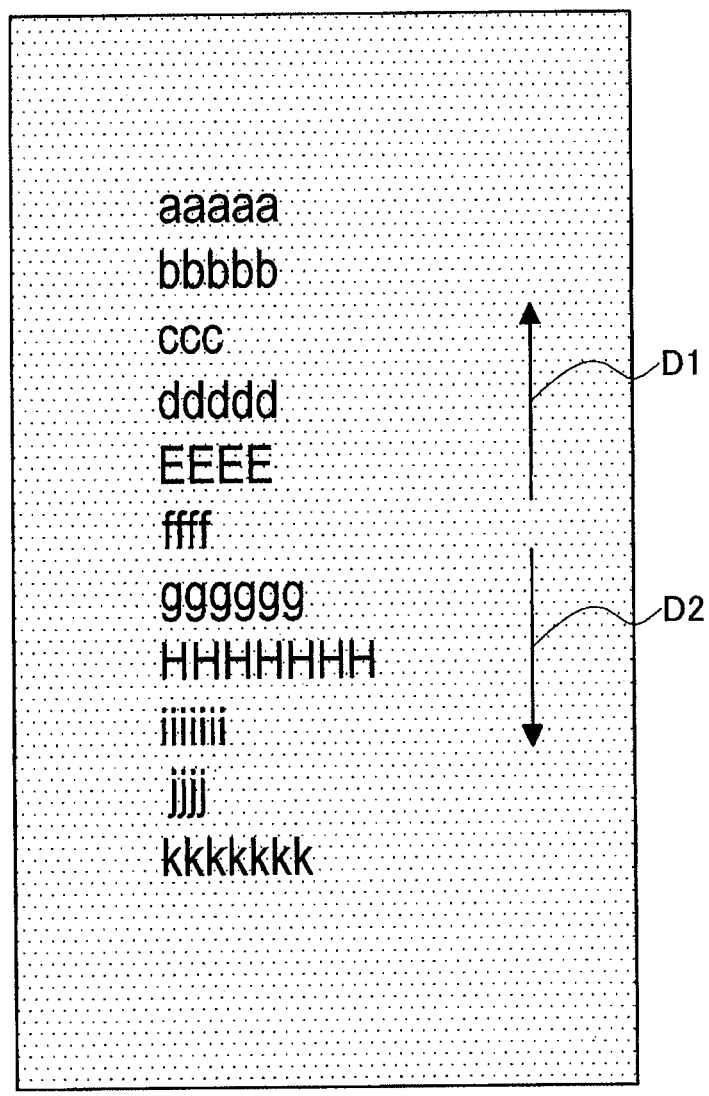
FIG. 13 is an explanatory view for explaining one example of a content to be displayed by the information processing apparatus according to the embodiment.

An information processing apparatus according to a third embodiment of the present invention will now be described with reference to FIGS. 11 to 14. FIG. 11 is an explanatory view for explaining a configuration of the information processing apparatus according to the present embodiment. FIG. 12 is an explanatory view for explaining an operation of the information processing apparatus according to the present embodiment. FIG. 13 is an explanatory view for explaining one example of a content to be displayed by the information processing apparatus according to the present embodiment.

Figure 14:
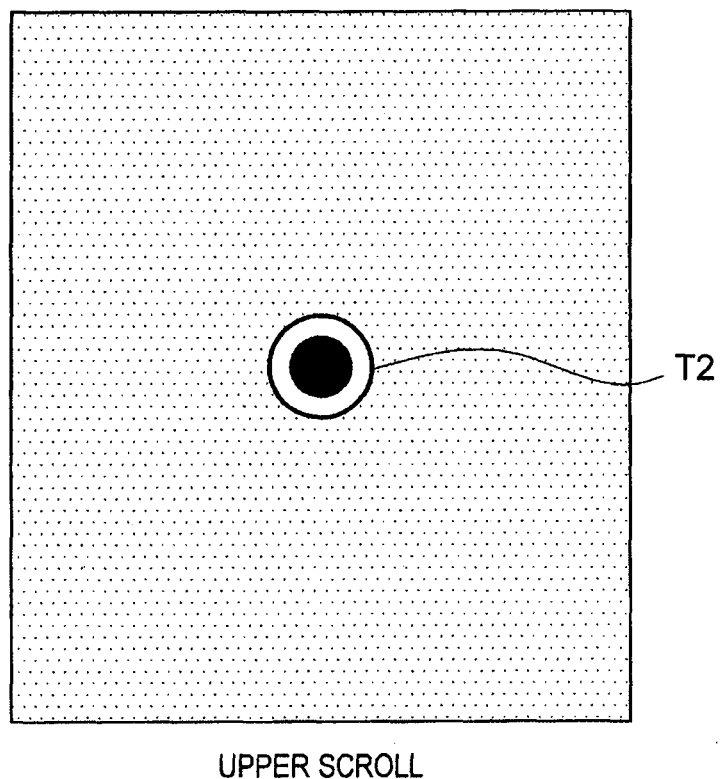
FIG. 14 is an explanatory view for explaining a scrolling operation in the information processing apparatus according to the embodiment.

FIG. 14 is an explanatory view for explaining a scrolling operation in the information processing apparatus according to the present embodiment. The information processing apparatuses 100, 200 according to the first embodiment and the second embodiment change the enlargement percentage or the reduction percentage at the changing amount corresponding to the magnitude of the contacting pressure. However, the display magnification may not be changed depending on the content to be displayed on the display device 12. One example of such content is shown in FIG. 13. That is, the content shown in FIG. 13 is text data, which is visible to the user without being enlarged or reduced and which scrolling direction is limited to upward direction or downward direction. The information processing apparatus according to the present embodiment thus scrolls the content to the upper side at a speed corresponding to the magnitude of the contacting pressure when displaying such content.

(Configuration)

As shown in FIG. 11, an information processing apparatus 300 according to the present embodiment includes an upper scrolling amount determining unit 122 in place of the enlargement percentage changing amount determining unit 120 and the scale changing unit 131 of the information processing apparatus 100 according to the first embodiment. Other configurations of the information processing apparatus 300 according to the present embodiment are the same as the other configurations of the information processing apparatus 100 according to the first embodiment.

The upper scrolling amount determining unit 122 acquires the pressure signal output from the pressure detecting unit 111, and determines the speed of movement (changing speed, also referred to as upper scrolling amount) to the upper side of the display range (display region) according to the magnitude of the contacting pressure represented by the pressure signal. The upper scrolling amount determining unit 122 increases the speed of movement (changing speed) to the upper side according to increase in the magnitude of the contacting pressure detected by the pressure detecting unit.

Similar to the enlargement percentage according to the first embodiment, the upper scrolling amount determining unit 122 also increases the speed of movement (changing speed) to the upper side of the display range (display region) with increase in the magnitude of the contacting pressure, as shown in FIG. 3A.

More specifically, the upper scrolling amount determining unit 122 determines the speed of movement (changing speed) to the upper side of the display range (display region) to 0 when the magnitude of the contacting pressure is smaller than P0. That is, when the magnitude of the contacting pressure is smaller than P0, the upper scrolling amount determining unit 122 does not move the display range (display region). This is to distinguish the other operations such as dragging and the movement of the display range by pressurization.

The upper scrolling amount determining unit 122 determines the speed of movement (changing speed) to the upper side to V1 corresponding to P1 when the magnitude of the contacting pressure is P1. The upper scrolling amount determining unit 122 determines the speed of movement (changing speed) to the upper side to V2 corresponding to P2 when the magnitude of the contacting pressure increases and becomes P2.

In addition to the movement of the contacting position detected by the position detecting unit 110, the scroll changing unit 130 of the present embodiment moves the display range according to the speed of movement (changing speed) to the upper side determined by the upper scrolling amount determining unit 122. More specifically, the scroll changing unit 130 moves the display range in the direction and at the speed corresponding to the direction and the speed of the movement speed of the contacting position detected by the position detecting unit 110, as described above. If the upper scrolling amount determining unit 122 determines the speed of movement (changing speed) to the upper side, the scroll changing unit 130 moves the display range to the upper side at the determined speed. That is, the scroll changing unit 130 increases the speed of movement (changing speed) according to the increase in the magnitude of the contacting pressure when the magnitude of the contacting pressure is increased.

One example of time change of the position of the display range (display region) is shown in FIG. 3B.

For instance, when the user presses the input device 11 at the contacting pressure of P1 from a state in which the display range (display region) is set at A0, the speed of movement (changing speed) to the upper side becomes V1 as shown in FIG. 3A. When the user continues to push the input device 11 at the contacting pressure of P1 during time t0 to t1, the display range (display region) is changed at the speed of V1 and becomes A1. For instance, when the user presses the input device 11 at the contacting pressure of P2 larger than P1 from a state in which the display range (display region) is set at A0, the speed of movement (changing speed) to the upper side becomes V2 which is larger than V1 as shown in FIG. 3A. When the user continues to push the input device 11 at the contacting pressure of P2 during time t0 to t1, the display range (display region) is moved at the speed of V1 and becomes A2 which is more distant than A1.

That is, the display range (display region) is moved at a faster speed when the user presses the input device 11 at a strong pressure, and the display range (display region) is changed at a slower speed when the user presses the input device 11 at a weak pressure.

(Operation)

The operation of the information processing apparatus 300 according to the present embodiment will now be described with reference to FIG. 12. The operation of the information processing apparatus 300 is basically the same as the operation of the information processing apparatus 100 according to the first embodiment. The processes of step S307 and step S111 are performed in place of the processes of step S107 and step S109 shown in FIG. 4.

In other words, in step S307, the upper scrolling amount determining unit 122 determines and outputs the speed of movement (changing speed) to the upper side of the display range (display region) corresponding to the magnitude of the contacting pressure. In the following process of step S111, the scroll changing unit 130 moves the display range according to the movement of the contacting position if after the process of step S103, and moves the display range at the speed of movement (changing speed) to the upper side determined in step S307 if after the process of step S307. Other operations by the information processing apparatus 300 according to the present embodiment are the same as the operations of the information processing apparatus 100 according to the first embodiment, and thus the description thereof will be omitted.

Representing the scrolling operation by the user in the information processing apparatus 300 according to the present embodiment, FIGS. 7A, 7C, 13, and 14 are obtained.

In other words, as shown in FIG. 7A, the contacted object contacts the touch screen at the position of the symbol T1, and at such position, the contacting pressure by the contacted object is increased and the touch screen is pressed as indicated by the symbol T2 of FIG. 14. The contacted object is released at the position of the symbol T3 as shown in FIG. 7C. When such operation is operated, step S101, step S103, step S105, step S307, step S111, step S113, and step S115 of the operations shown in FIG. 12 are sequentially processed, and the operation is terminated. Through such operation, the information processing apparatus 300 moves the display range (display region) displayed on the display device 12 of the content to the upper side at the speed of movement (changing speed, see e.g., FIG. 3A) to the upper side corresponding to the magnitude of the contacting pressure. That is, the information processing apparatus 300 scrolls the content to the upper side at the changing amount corresponding to the magnitude of the contacting pressure indicated by the symbol T2, as indicated by an arrow D1 of FIG. 13.

(Example of Effects)

The information processing apparatus 300 according to the present embodiment has been described. According to such information processing apparatus 300, the user can drag the input device 11 to scroll the content and the user can press the input device 11 to scroll the content to the upper side at a speed corresponding to the pressure, that is, the magnitude of the contacting pressure of the contacted object. Thus, the user can operate scrolling with one finger, and can control the speed of scrolling to the upper side by the pressing force. Therefore, the operability can be enhanced with the information processing apparatus 300 according to the present embodiment, similar to the information processing apparatuses 100, 200 according to the first embodiment and the second embodiment.

Fourth Embodiment

Figure 15:
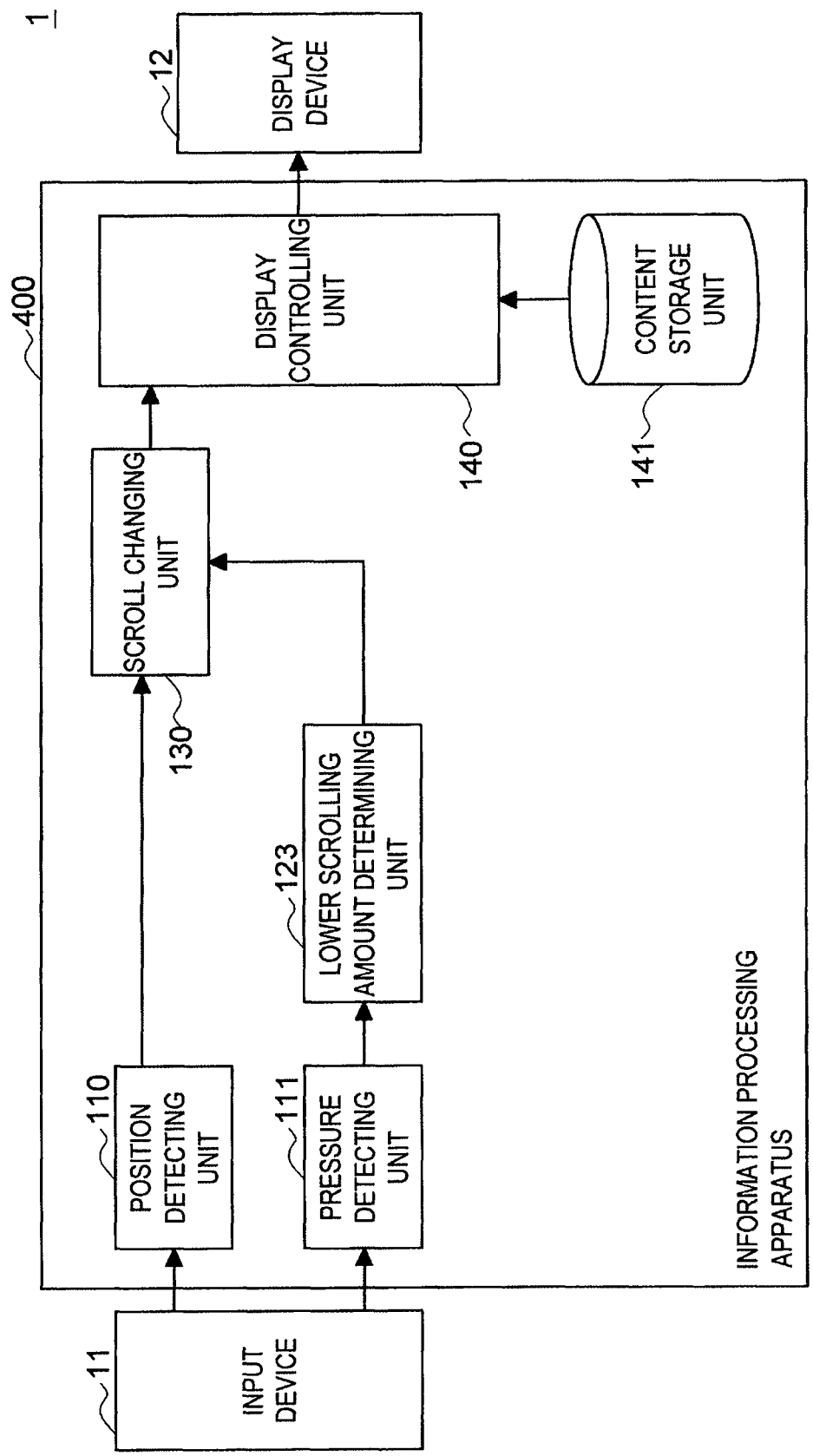
FIG. 15 is an explanatory view for explaining a configuration of an information processing apparatus according to a fourth embodiment of the present invention.
Figure 16:
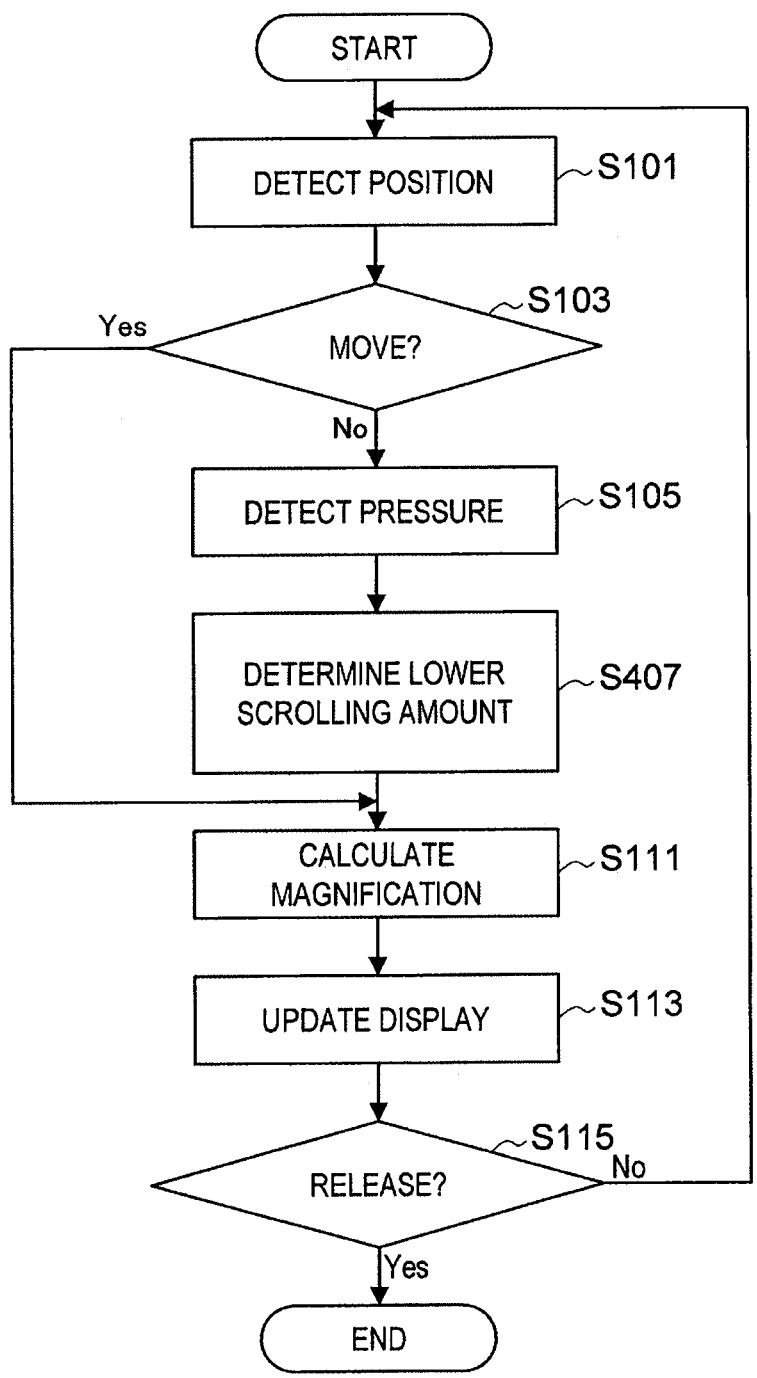
FIG. 16 is an explanatory view for explaining an operation of the information processing apparatus according to the embodiment.
Figure 17:
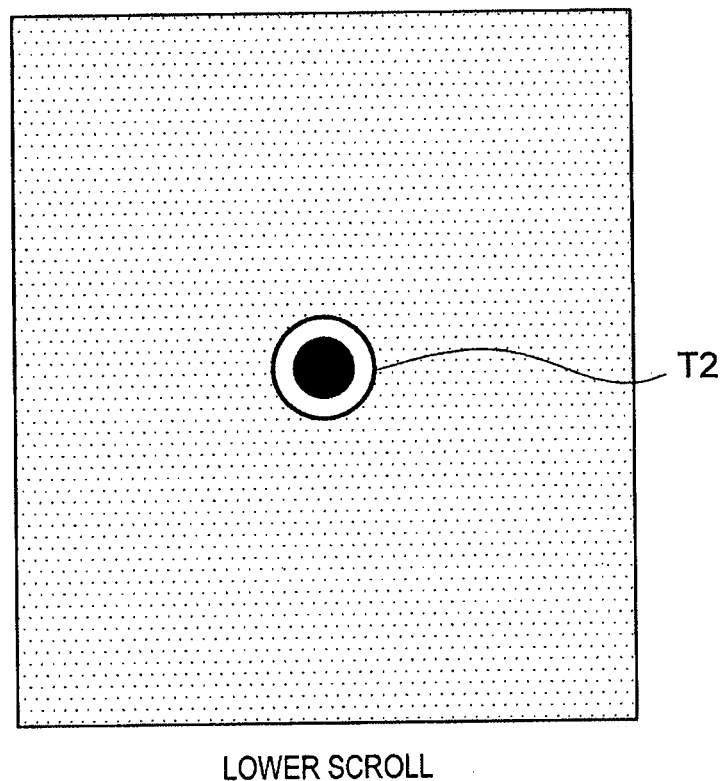
FIG. 17 is an explanatory view for explaining a scrolling operation in the information processing apparatus according to the embodiment.

An information processing apparatus according to a fourth embodiment of the present invention will now be described with reference to FIGS. 15 to 17. FIG. 15 is an explanatory view for explaining a configuration of the information processing apparatus according to the present embodiment. FIG. 16 is an explanatory view for explaining an operation of the information processing apparatus according to the present embodiment. FIG. 17 is an explanatory view for explaining a scrolling operation in the information processing apparatus according to the present embodiment. The information processing apparatus 300 according to the third embodiment scrolls the content to the upper side at a speed corresponding to the magnitude of the contacting pressure. The information processing apparatus according to the present embodiment similarly scrolls the content to the lower side.

(Configuration)

As shown in FIG. 15, an information processing apparatus 400 according to the present embodiment includes a lower scrolling amount determining unit 123 in place of the upper scrolling amount determining unit 122 of the information processing apparatus 300 according to the third embodiment. Other configurations of the information processing apparatus 400 according to the present embodiment are the same as the other configurations of the information processing apparatus 300 according to the third embodiment.

The lower scrolling amount determining unit 123 acquires the pressure signal output from the pressure detecting unit 111, and determines the speed of movement (changing speed, also referred to as lower scrolling amount) to the lower side of the display range (display region) according to the magnitude of the contacting pressure represented by the pressure signal. The lower scrolling amount determining unit 123 increases the speed of movement (changing speed) to the lower side according to increase in the magnitude of the contacting pressure detected by the pressure detecting unit.

Similar to the speed of movement to the upper side according to the third embodiment, the lower scrolling amount determining unit 123 also increases the speed of movement (changing speed) to the lower side of the display range (display region) with increase in the magnitude of the contacting pressure, as shown in FIG. 3A.

More specifically, the lower scrolling amount determining unit 123 determines the speed of movement (changing speed) to the lower side of the display range (display region) to 0 when the magnitude of the contacting pressure is smaller than P0. That is, when the magnitude of the contacting pressure is smaller than P0, the lower scrolling amount determining unit 123 does not move the display range (display region). This is to distinguish the other operations such as dragging and the movement of the display range by pressurization.

The lower scrolling amount determining unit 123 determines the speed of movement (changing speed) to the lower side to V1 corresponding to P1 when the magnitude of the contacting pressure is P1. The lower scrolling amount determining unit 123 determines the speed of movement (changing speed) to the lower side to V2 corresponding to P2 when the magnitude of the contacting pressure increases and becomes P2.

In addition to the movement of the contacting position detected by the position detecting unit 110, the scroll changing unit 130 of the present embodiment moves the display range according to the speed of movement (changing speed) to the lower side determined by the lower scrolling amount determining unit 123. More specifically, the scroll changing unit 130 moves the display range in the direction and at the speed corresponding to the direction and the speed of the movement speed of the contacting position detected by the position detecting unit 110, as described above. If the lower scrolling amount determining unit 123 determines the speed of movement (changing speed) to the lower side, the scroll changing unit 130 moves the display range to the lower side at the determined speed. That is, the scroll changing unit 130 increases the speed of movement (changing speed) according to the increase in the magnitude of the contacting pressure when the magnitude of the contacting pressure is increased.

One example of time change of the position of the display range (display region) is shown in FIG. 3B.

For instance, when the user presses the input device 11 at the contacting pressure of P1 from a state in which the display range (display region) is set at A0, the speed of movement (changing speed) to the lower side becomes V1 as shown in FIG. 3A. When the user continues to push the input device 11 at the contacting pressure of P1 during time t0 to t1, the display range (display region) is changed at the speed of V1 and becomes A1. For instance, when the user presses the input device 11 at the contacting pressure of P2 larger than P1 from a state in which the display range (display region) is set at A0, the speed of movement (changing speed) to the lower side becomes V2 which is larger than V1 as shown in FIG. 3A. When the user continues to push the input device 11 at the contacting pressure of P2 during time t0 to t1, the display range (display region) is moved at the speed of V1 and becomes A2 which is more distant than A1.

That is, the display range (display region) is moved at a faster speed when the user presses the input device 11 at a strong pressure, and the display range (display region) is changed at a slower speed when the user presses the input device 11 at a weak pressure.

(Operation)

The operation of the information processing apparatus 400 according to the present embodiment will now be described with reference to FIG. 16. The operation of the information processing apparatus 400 is basically the same as the operation of the information processing apparatus 300 according to the third embodiment. The process of step S407 is performed in place of the process of step S307 shown in FIG. 12.

In other words, in step S407, the lower scrolling amount determining unit 123 determines and outputs the speed of movement (changing speed) to the lower side of the display range (display region) corresponding to the magnitude of the contacting pressure. In the following process of step S111, the scroll changing unit 130 moves the display range according to the movement of the contacting position if after the process of step S103, and moves the display range at the speed of movement (changing speed) to the lower side determined in step S407 if after the process of step S407. Other operations by the information processing apparatus 400 according to the present embodiment are the same as the operations of the information processing apparatus 300 according to the third embodiment, and thus the description thereof will be omitted.

Representing the scrolling operation by the user in the information processing apparatus 400 according to the present embodiment, FIGS. 7A, 7C, and 17 are obtained.

In other words, as shown in FIG. 7A, the contacted object contacts the touch screen at the position of the symbol T1, and at such position, the contacting pressure by the contacted object is increased and the touch screen is pressed as indicated by the symbol T2 of FIG. 17. The contacted object is released at the position of the symbol T3 as shown in FIG. 7C. When such operation is operated, step S101, step S103, step S105, step S407, step S111, step S113, and step S115 of the operations shown in FIG. 16 are sequentially processed, and the operation is terminated. Through such operation, the information processing apparatus 400 moves the display range (display region) displayed on the display device 12 of the content to the lower side at the speed of movement (changing speed, see e.g., FIG. 3A) to the lower side corresponding to the magnitude of the contacting pressure. That is, the information processing apparatus 400 scrolls the content to the lower side at the changing amount corresponding to the magnitude of the contacting pressure indicated by the symbol T2, as indicated by an arrow D2 of FIG. 13.

(Example of Effects)

The information processing apparatus 400 according to the present embodiment has been described. According to such information processing apparatus 400, the user can drag the input device 11 to scroll the content and the user can press the input device 11 to scroll the content to the lower side at a speed corresponding to the pressure, that is, the magnitude of the contacting pressure of the contacted object. Thus, the user can operate scrolling with one finger, and can control the speed of scrolling to the lower side by the pressing force. Therefore, the operability can be enhanced with the information processing apparatus 400 according to the present embodiment, similar to the information processing apparatus 300 according to the third embodiment.

Fifth Embodiment

Figure 18:
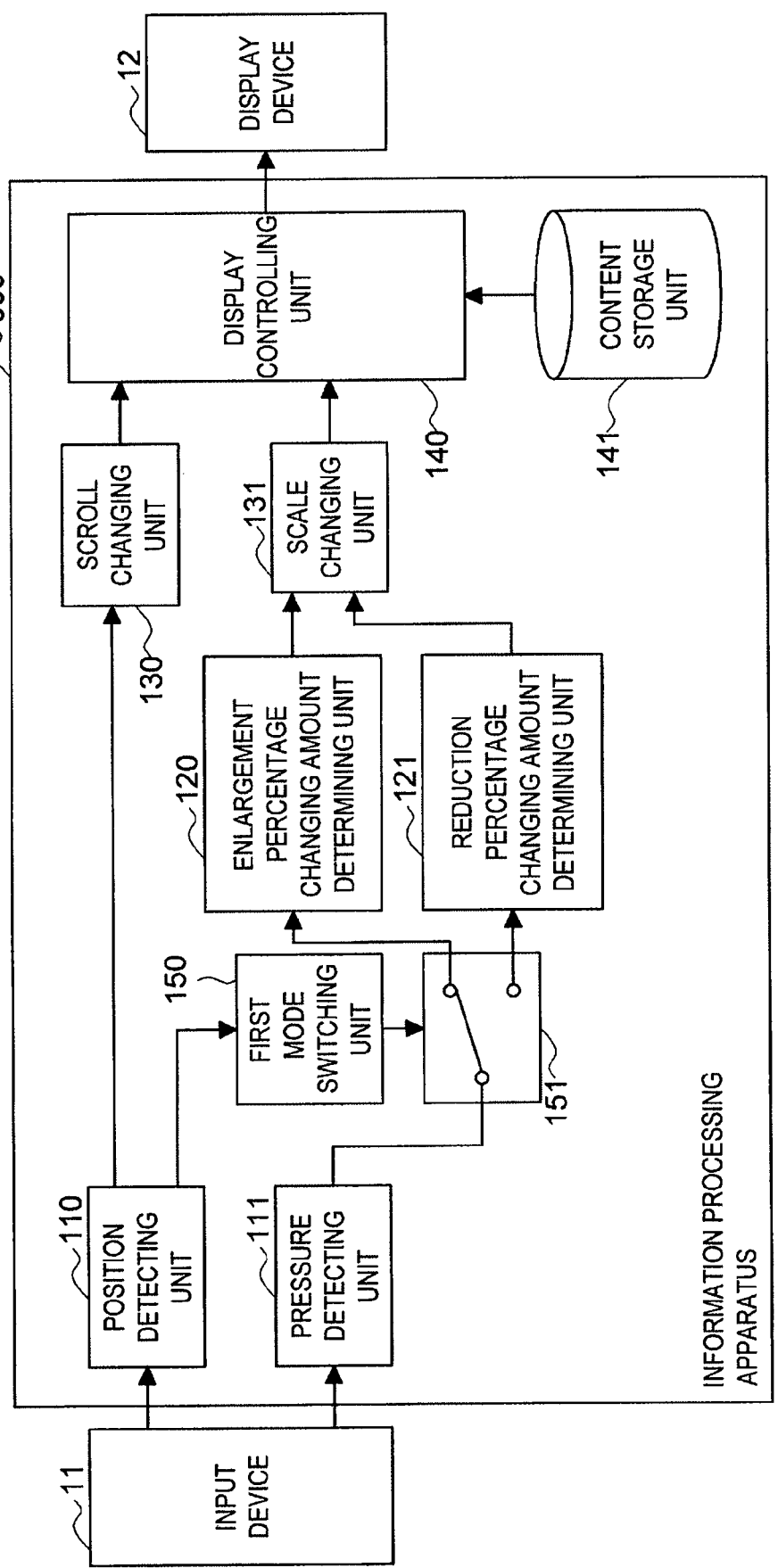
FIG. 18 is an explanatory view for explaining a configuration of an information processing apparatus according to a fifth embodiment of the present invention.
Figure 19:
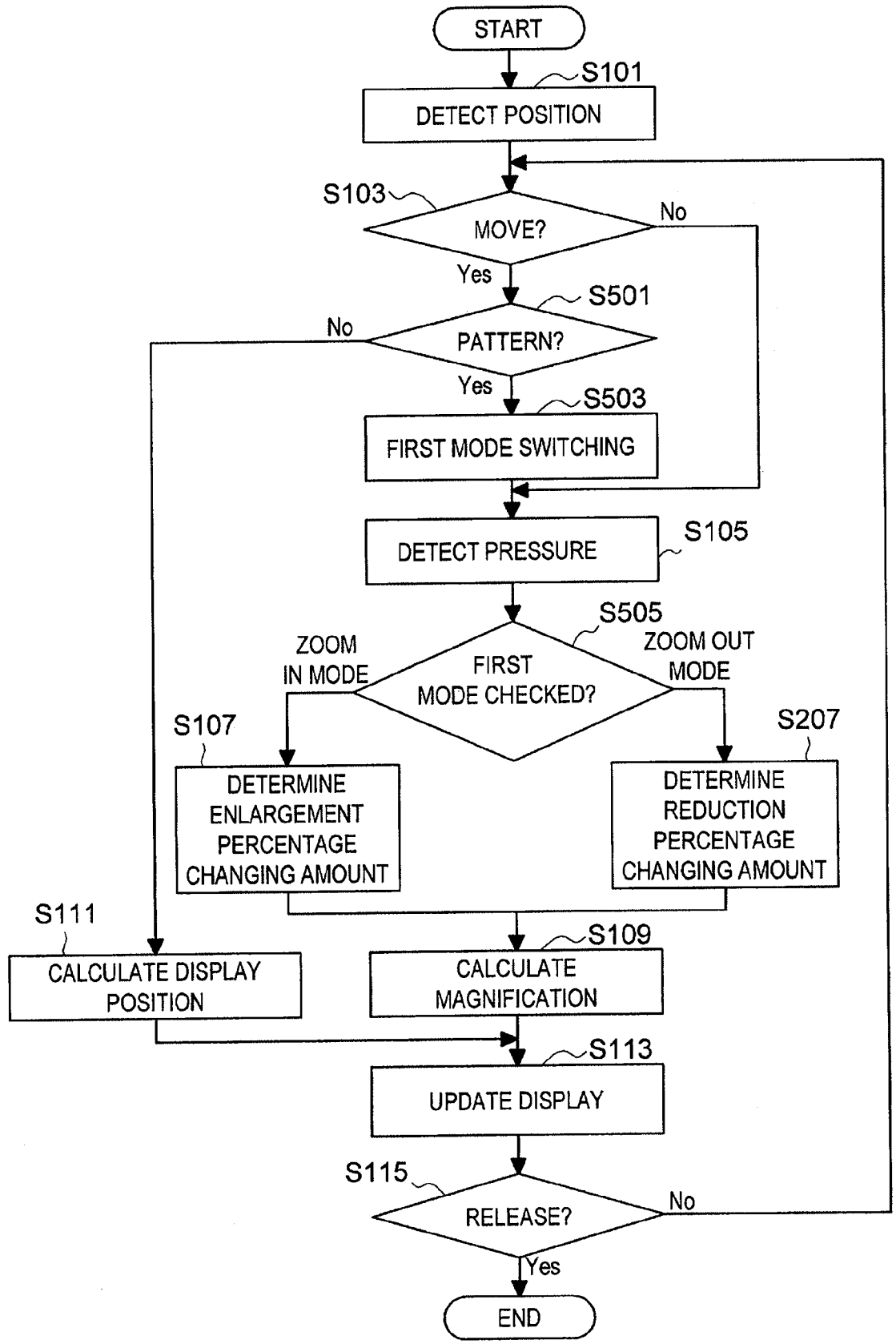
FIG. 19 is an explanatory view for explaining an operation of the information processing apparatus according to the embodiment.
Figure 20:
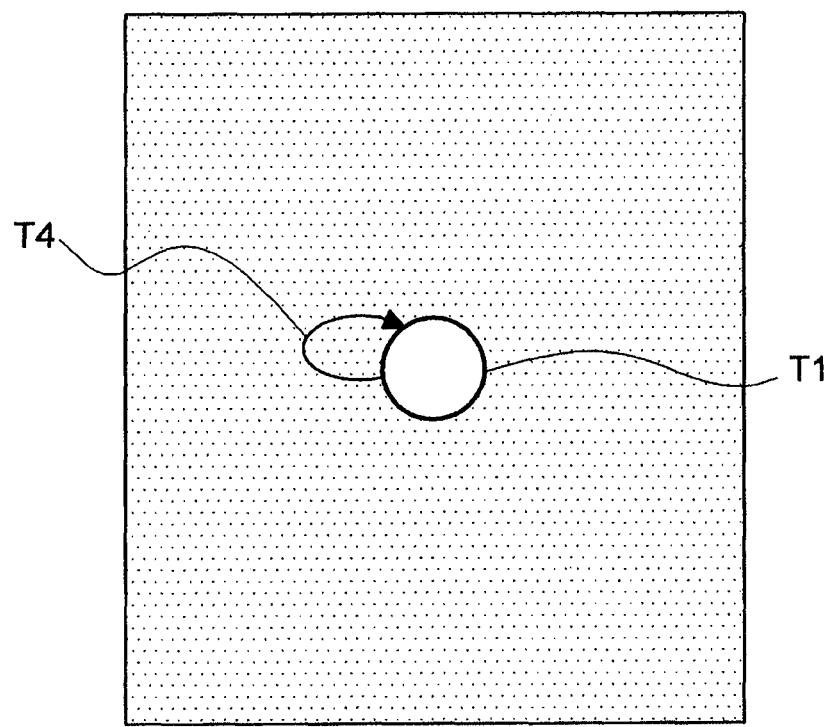
FIG. 20 is an explanatory view for explaining a first mode switching operation in the information processing apparatus according to the embodiment.

An information processing apparatus according to a fifth embodiment of the present invention will now be described with reference to FIGS. 18 to 20. FIG. 18 is an explanatory view for explaining a configuration of the information processing apparatus according to the present embodiment. FIG. 19 is an explanatory view for explaining an operation of the information processing apparatus according to the present embodiment. FIG. 20 is an explanatory view for explaining a first mode switching operation in the information processing apparatus according to the present embodiment. The information processing apparatus 100 according to the first embodiment and the information processing apparatus 200 according to the second embodiment change either the enlargement percentage or the reduction percentage at the changing amount corresponding to the magnitude of the contacting pressure. The information processing apparatus according to the present embodiment can switch between whether to change the enlargement percentage or to change the reduction percentage by the changing amount corresponding to the magnitude of the contacting pressure.

As shown in FIG. 18, an information processing apparatus 500 according to the present embodiment includes the reduction percentage changing amount determining unit 121 of the information processing apparatus 200 according to the second embodiment, and also a first mode switching unit 150 and a first switch unit 151 in addition to the configuration of the information processing apparatus 100 according to the first embodiment. Other configurations of the information processing apparatus 500 according to the present embodiment are the same as the other configurations of the information processing apparatus 100 according to the first embodiment.

The first mode switching unit 150 switches the mode (first mode) of scaling. That is, the first mode switching unit 150 switches between a zoom-in mode (one example of enlargement mode) of changing the enlargement percentage and a zoom-out mode (one example of reduction mode) of changing the reduction percentage. In this case, the first mode switching unit 150 performs mode switching based on the movement trajectory of the contacting position detected by the position detecting unit 110.

One example of the movement of the contacting position for causing mode switching is as described below.

One example of the movement trajectory of the contacting position for causing mode switching is shown in FIG. 20. The contacted object touches the touch screen at the position of the symbol T1, the contacted object is dragged in the direction of the symbol T4, and if the trajectory of the dragging, that is, the movement trajectory of the contacting position detected by the position detecting unit 110 is a predetermined pattern (substantially circular in FIG. 20), the first mode switching unit 150 switches the mode. More specifically, if the movement trajectory of the contacting position detected by the position detecting unit 110 is a predetermined pattern while being set in the zoom-out mode, the first mode switching unit 150 switches the mode to the zoom-in mode. If the movement trajectory of the contacting position detected by the position detecting unit 110 is a predetermined pattern while being set in the zoom-in mode, the first mode switching unit 150 switches the mode to the zoom-out mode. The movement trajectory of the contacting position for switching the mode is described as being common for each mode, but the movement trajectory may differ for every mode.

The first switching unit 151 is controlled by the first mode switching unit 150, and switches whether to output the pressure signal from the pressure detecting unit 111 to the enlargement percentage changing amount determining unit 120 or to output the pressure signal to the reduction percentage changing amount determining unit 121. The first switching unit 151 outputs the pressure signal to the enlargement percentage changing amount determining unit 120 when set in the zoom-in mode, and outputs the pressure signal to the reduction percentage changing amount determining unit 121 when set in the zoom-out mode.

Therefore, the information processing apparatus 500 can switch between enlarge and reduce by including the first mode switching unit 150 and the first switching unit 151.

(Operation)

The operation of the information processing apparatus 500 according to the present embodiment will now be described with reference to FIG. 19. The operation of the information processing apparatus 500 is basically the same as the operation of the information processing apparatus 100 according to the first embodiment or the information processing apparatus 200 according to the second embodiment. However, the processes of step S501 and step S503 are performed after the process of step S103 shown in FIG. 4 or FIG. 9, and the process of step S505 is performed after the process of step S105 shown in FIG. 4 or FIG. 9. The processes after step S505 are the same as the processes after step S109 of FIG. 4 or the processes after step S109 of FIG. 9.

That is, the position detecting unit 110 determines whether or not the contacting position has moved in step S103, where the process proceeds to step S105 (detect pressure) if the contacting position is not moved, similar to FIG. 4 or FIG. 9, and the scaling operation of enlargement or reduction is performed according to the currently set mode. The process proceeds to step S501 if the contacting position is moved, where the first mode switching unit 150 determines whether or not the trajectory of the movement of the contacting position is a predetermined pattern in step S501. The process proceeds to step S111 if the trajectory of the movement of the contacting position is not a predetermined pattern, and similar scrolling operation is performed. The process proceeds to the process of step S503 if the trajectory of the movement of the contacting position is a predetermined pattern.

The first mode switching unit 150 switches the mode in step S503. More specifically, the first mode switching unit 150 switches the mode to the zoom-out mode when set in the zoom-in mode, and the first mode switching unit 150 switches the mode to the zoom-in mode when set in the zoom-out mode. The switching of the first switching unit 151 is performed based on the set mode. The process then proceeds to step S105, where the pressure detecting unit 111 detects the magnitude of the contacting pressure, and then the process proceeds to step S505. Whether the set mode is the zoom-out mode or the zoom-in mode is checked in step S505. In the present embodiment, this checking is performed depending on whether the first switching unit 151 outputs the pressure signal from the pressure detecting unit 111 to the enlargement percentage changing amount determining unit 120 or outputs the pressure signal to the reduction percentage changing amount determining unit 121. If the zoom-in mode is set, that is, if the pressure signal is output to the enlargement percentage changing amount determining unit 120, step S107, step S109, step S113, and step S115 are sequentially processed (i.e., enlargement operation shown in FIG. 4 is performed). If the zoom-out mode is set, that is, if the pressure signal is output to the reduction percentage changing amount determining unit 121, step S207, step S109, step S113, and step S115 are sequentially processed (i.e., reduction operation shown in FIG. 9 is performed).

Representing the switching operation of the mode (first mode) of scaling by the user in the case of the information processing apparatus 500 according to the present embodiment, FIGS. 7A, 7B, 20, 10, and 7C are obtained.

In other words, as shown in FIG. 7A, the contacted object contacts the touch screen at the position of the symbol T1, and at such position, the contacting pressure by the contacted object is increased and the touch screen is pressed as indicated by the symbol T2 of FIG. 7B while being set in the zoom-in mode. The contacted object is released at the position of the symbol T3 as shown in FIG. 7C. When such operation is operated, step S101, step S103, step S105, step S505, step S107, step S109, step S113, and step S115 of the operations shown in FIG. 19 are sequentially processed, and the operation is terminated. Through such operation, the information processing apparatus 500 changes the enlargement percentage to be displayed on the display device 12 of the content at the changing amount (changing speed, see e.g., FIG. 3A) corresponding to the magnitude of the contacting pressure. That is, the information processing apparatus 500 enlarges the content at the changing amount corresponding to the magnitude of the contacting pressure indicated by the symbol T2.

As shown in FIG. 20, when the contacted object touches the touch screen at the position of the symbol T1, and thereafter, is dragged in the direction indicated by the symbol T4, the mode is switched to the zoom-out mode. After being dragged, the contacting pressure by the contacted object is increased and the touch screen is pressed as indicated by the symbol T2 of FIG. 7B. The contacted object is released at the position of the symbol T3 as shown in FIG. 7C. When such operation is operated, step S101, step S103, step S501, step S503, step S105, step S505, step S207, step S109, step S113, and step S115 of the operations shown in FIG. 19 are sequentially processed, and the operation is terminated. Through such operation, the information processing apparatus 500 changes the mode from the zoom-in mode to the zoom-out mode and changes the reduction percentage to be displayed on the display device 12 of the content at the changing amount (changing speed, see e.g., FIG. 3A) corresponding to the magnitude of the contacting pressure. That is, the information processing apparatus 500 reduces the content at the changing amount corresponding to the magnitude of the contacting pressure indicated by the symbol T2.

(Example of Effects)

The information processing apparatus 500 according to the present embodiment has been described. According to such information processing apparatus 500, the effects of both the information processing apparatus 100 according to the first embodiment and the information processing apparatus 200 according to the second embodiment are obtained. That is, the user can drag the input device 11 to switch between enlargement and reduction. The user can drag the input device 11 to scroll the content and the user can press the input device 11 to change (zoom-in or zoom-out) the enlargement percentage or the reduction percentage at the changing amount corresponding to the pressure, that is, the magnitude of the contacting pressure of the contacted object. Thus, the user can operate not only scrolling but scaling of both enlargement and reduction with one finger, and can control the speed of changing the scale by the pressing force. Therefore, the operability can be further enhanced with the information processing apparatus 500 according to the present embodiment than the information processing apparatus 100 according to the first embodiment and the information processing apparatus 200 according to the second embodiment.

Sixth Embodiment

Figure 21:
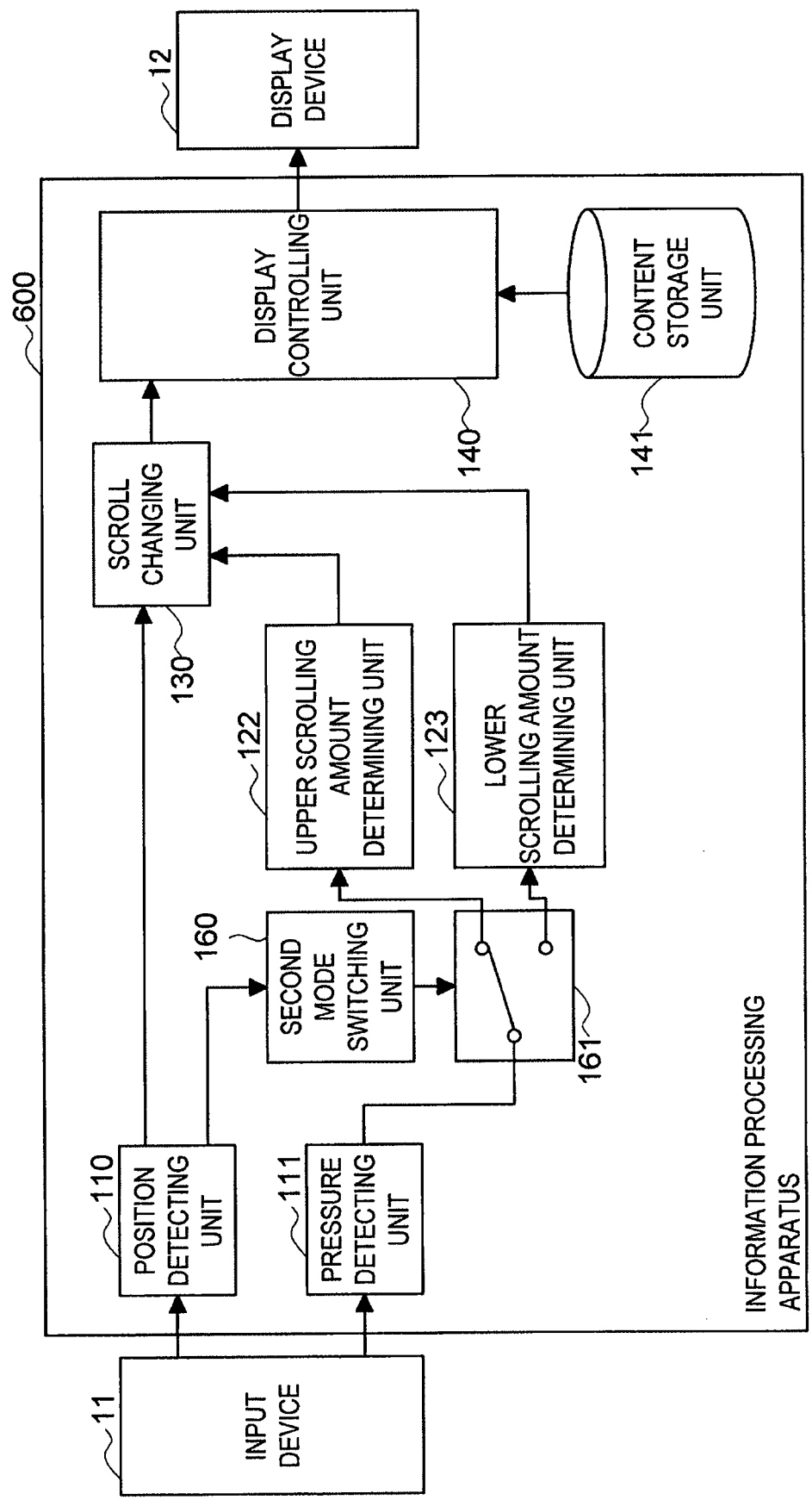
FIG. 21 is an explanatory view for explaining a configuration of an information processing apparatus according to a sixth embodiment of the present invention.
Figure 22:
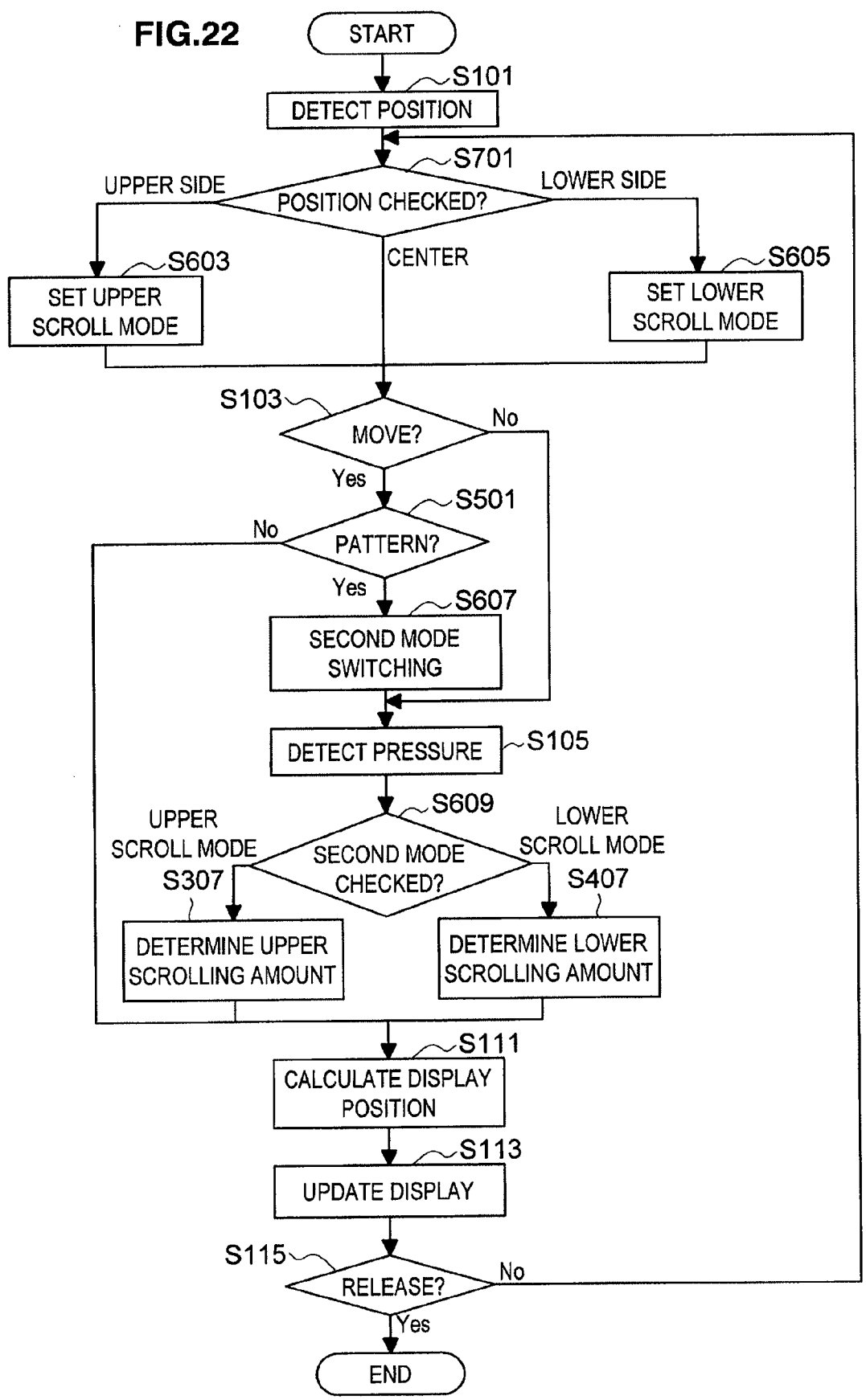
FIG. 22 is an explanatory view for explaining an operation of the information processing apparatus according to the embodiment.
Figure 23:
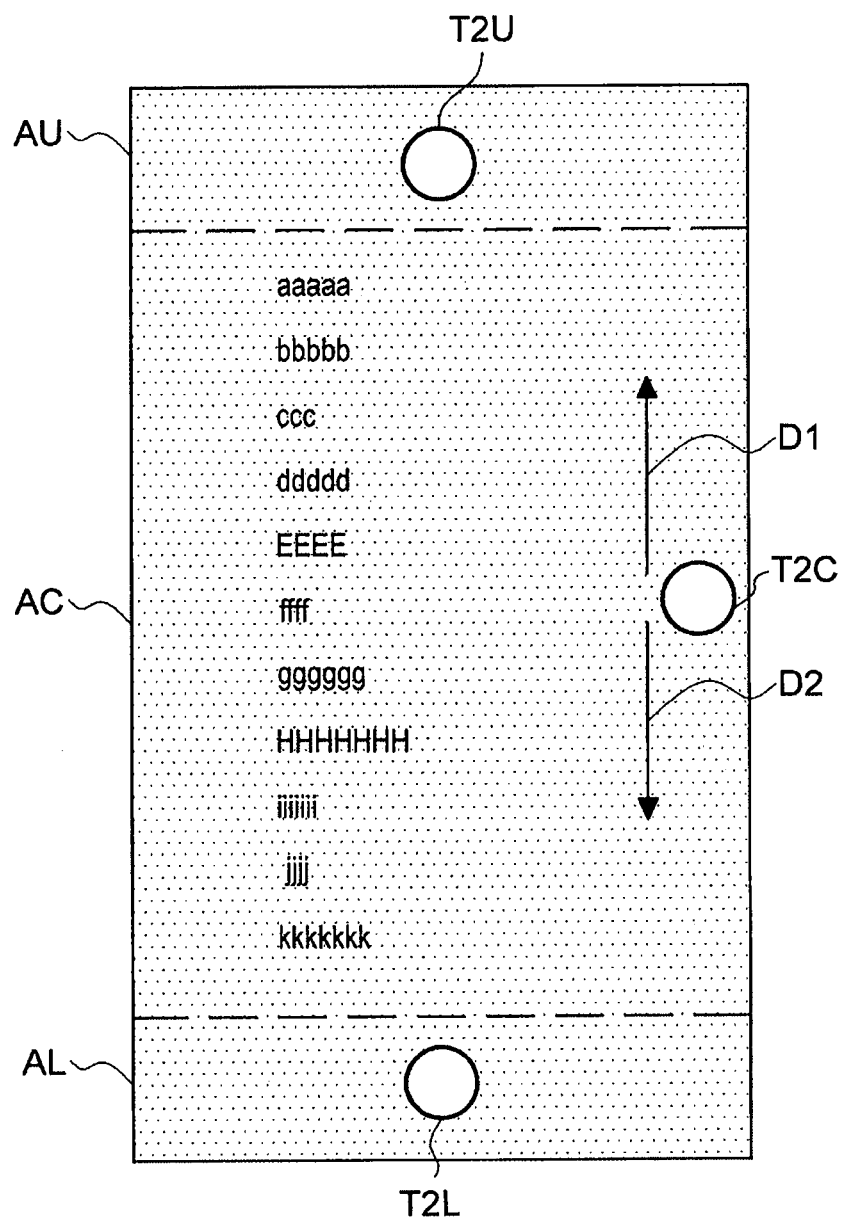
FIG. 23 is an explanatory view for explaining a second mode switching operation in the information processing apparatus according to the embodiment.

An information processing apparatus according to a sixth embodiment of the present invention will now be described with reference to FIGS. 21 to 23. FIG. 21 is an explanatory view for explaining a configuration of the information processing apparatus according to the present embodiment. FIG. 22 is an explanatory view for explaining an operation of the information processing apparatus according to the present embodiment. FIG. 23 is an explanatory view for explaining a second mode switching operation in the information processing apparatus according to the present embodiment. The information processing apparatus 300 according to the third embodiment and the information processing apparatus 400 according to the fourth embodiment scroll the content either to the upper side or the lower side at a speed corresponding to the magnitude of the contacting pressure. The information processing apparatus according to the present embodiment switches between whether to scroll to the upper side or scroll to the lower side at a speed corresponding to the magnitude of the contacting pressure.

As shown in FIG. 21, an information processing apparatus 600 according to the present invention includes a lower scrolling amount determining unit 123 of the information processing apparatus 400 according to the fourth embodiment, and furthermore, a second mode switching unit 160 and a second switching unit 161 in addition to the information processing apparatus 300 according to the third embodiment. Other configurations of the information processing apparatus 600 according to the present embodiment are the same as the other configurations of the information processing apparatus 300 according to the third embodiment.

The second mode switching unit 160 switches the mode (second mode) of scrolling. That is, the second mode switching unit 160 switches between an upper scroll mode (one example of one direction mode) of scrolling the content to the upper side and a lower scroll mode (one example of other direction mode) of scrolling the content to the lower side. In this case, the second mode switching unit 160 performs mode switching based on the contacting position detected by the position detecting unit 110 or the movement trajectory of the contacting position.

One example of the contacting position for causing mode switching or the movement of the contacting position is as described below.

One example of the contacting position for causing mode switching is shown in FIG. 23. In other words, the upper scroll mode is set when the contacting position of the contacted object to the touch screen is in an upper area AU of the input device 11, and a lower scroll mode is set when the contacting position is in a lower area AL of the input device 11.

One example of the movement trajectory of the contacting position for causing mode switching is shown in FIG. 20. The contacted object touches the touch screen at the position of the symbol T1, the contacted object is dragged in the direction of the symbol T4, and if the trajectory of the dragging, that is, the movement trajectory of the contacting position detected by the position detecting unit 110 is a predetermined pattern (substantially circular in FIG. 20), the second mode switching unit 160 switches the mode. More specifically, if the movement trajectory of the contacting position detected by the position detecting unit 110 is a predetermined pattern while being set in the upper scroll mode, the second mode switching unit 160 switches the mode to the lower scroll mode. If the movement trajectory of the contacting position detected by the position detecting unit 110 is a predetermined pattern while being set in the lower scroll mode, the second mode switching unit 160 switches the mode to the upper scroll mode. The pattern of the movement trajectory of the contacting position for switching the mode is described as being common for each mode, but the movement trajectory may differ for every mode.

The second switching unit 161 is controlled by the second mode switching unit 160, and switches whether to output the pressure signal from the pressure detecting unit 111 to the upper scrolling amount determining unit 122 or to output the pressure signal to the lower scrolling amount determining unit 123. The second switching unit 161 outputs the pressure signal to the upper scrolling amount determining unit 122 when set in the upper scroll mode, and outputs the pressure signal to the lower scrolling amount determining unit 123 when set in the lower scroll mode.

Therefore, the information processing apparatus 600 can switch between upper scroll and lower scroll by including the second mode switching unit 160 and the second switching unit 161.

(Operation)

The operation of the information processing apparatus 600 according to the present embodiment will now be described with reference to FIG. 22. The operation of the information processing apparatus 600 is basically the same as the operation of the information processing apparatus 300 according to the third embodiment or the information processing apparatus 400 according to the fourth embodiment. However, the processes of step S601 and, at times, step S503 or step S605 are performed after the process of step S101 shown in FIG. 12 or FIG. 16, the processes of step S501 and, at times, step S607 are performed after the process of step S103 shown in FIG. 12 or FIG. 16, and the process of step S609 is performed after the process of step S105 shown in FIG. 12 or FIG. 16. The processes after step S609 are similar to the processes after step S307 of FIG. 12 or the processes after step S407 of FIG. 16.

That is, the position detecting unit 110 of the information processing apparatus 100 detects the contacting position of the contacted object in step S101, and thereafter, the process of step S701 is performed, and the second mode switching unit 160 checks the contacting position of the contacted object. If the contacting position is in the upper area AU of the input device 11, the process proceeds to step S603, and the second mode switching unit 160 sets the mode to the upper scroll mode and proceeds to the next step S103. If the contacting position is in the lower area AL of the input device 11, the process proceeds to step S605, and the second mode switching unit 160 sets the mode to the lower scroll mode and proceeds to the next step S103. Furthermore, if the contacting position is in a center area AC (see FIG. 23) of the input device 11, the second mode switching unit 160 maintains the previously set mode without switching the mode and proceeds to the next step S103.

In step S103, the position detecting unit 110 determines whether or not the contacting position has moved, and proceeds to step S105 (detect pressure) if the contacting position is not moved, similar to FIG. 12 or FIG. 16, and the scrolling operation to the upper side or the lower side is performed according to the currently set mode. The process proceeds to step S501 if the contacting position is moved, where the second mode switching unit 160 determines whether or not the trajectory of the movement of the contacting position is a predetermined pattern in step S501. The process proceeds to step S111 if the trajectory of the movement of the contacting position is not a predetermined pattern, and similar scrolling operation is performed. The process proceeds to the process of step S607 if the trajectory of the movement of the contacting position is a predetermined pattern.

The second mode switching unit 160 switches the mode in step S607. More specifically, the second mode switching unit 160 switches the mode to the lower scroll mode when set to the upper scroll mode, and the second mode switching unit 160 switches the mode to the upper scroll mode when set to the lower scroll mode. The switching of the second switching unit 161 is performed based on the set mode. The process then proceeds to step S105, where the pressure detecting unit 111 detects the magnitude of the contacting pressure, and then the process proceeds to step S609. Whether the set mode is the upper scroll mode or the lower scroll mode is checked in step S609. In the present embodiment, this checking is performed depending on whether the second switching unit 161 outputs the pressure signal from the pressure detecting unit 111 to the upper scrolling amount determining unit 122 or outputs the pressure signal to the lower scrolling amount determining unit 123. If the upper scroll mode is set, that is, if the pressure signal is output to the upper scrolling amount determining unit 122, step S307, step S113, and step S115 are sequentially processed (i.e., upper scrolling operation shown in FIG. 12 is performed). If the lower scroll mode is set, that is, if the pressure signal is output to the lower scrolling amount determining unit 123, step S407, step S113, and step S115 are sequentially processed (i.e., lower scrolling operation shown in FIG. 16 is performed).

Representing the switching operation of the mode (second mode) of scrolling by the user in the case of the information processing apparatus 600 according to the present embodiment, FIGS. 23, 7A, 7B, 20, 10, and 7C are obtained.

In other words, as shown in FIG. 23, when the contacted object contacts the touch screen at the position of the symbol T2U, that is, when the contacted object contacts the upper area AU of the input device 11, step S603 is processed and the upper scroll mode is set. When the contacted object contacts the touch screen at a position of a symbol T2C, that is, when the contacted object contacts the center area AC of the input device 11, the previously set scroll mode is maintained. When the contacted object contacts the touch screen at the position of the symbol T2L, that is, when the contacted object contacts the lower area AL of the input device 11, step S605 is processed and the lower scroll mode is set. An example where the contacted object contacts the lower area AL of the input device 11 and the lower scroll mode is set will be described below by way of example.

The contacting pressure by the contacted object is increased and the touch screen is pressed as indicated by the symbol T2 of FIG. 7B with the contacted object contacting the lower area AL of the input device 11. The contacted object is released at the position of the symbol T3 as shown in FIG. 7C. When such operation is operated, step S103, step S105, step S609, step S407, step S111, step S113, and step S115 of the operations shown in FIG. 22 are sequentially processed, and the operation is terminated. Through such operation, the information processing apparatus 600 scrolls the content in the downward direction at a speed (changing speed, see e.g., FIG. 3A) corresponding to the magnitude of the contacting pressure.

As shown in FIG. 20, when the contacted object is dragged in the direction indicated by the symbol T4 while contacting the lower area AL of the input device 11, the mode is switched to the upper scroll mode. After being dragged, the contacting pressure by the contacted object is increased and the touch screen is pressed as indicated by the symbol T2 of FIG. 7B. The contacted object is released at the position of the symbol T3 as shown in FIG. 7C. When such operation is operated, step S103, step S501, step S607, step S105, step S609, step S407, step S113, and step S115 of the operations shown in FIG. 22 are sequentially processed, and the operation is terminated. Through such operation, the information processing apparatus 600 changes the mode from the lower scroll mode to the upper scroll mode and scrolls the content in the upward direction at a speed (changing speed, see e.g., FIG. 3A) corresponding to the magnitude of the contacting pressure.

(Example of Effects)

The information processing apparatus 600 according to the present embodiment has been described. According to such information processing apparatus 600, the effects of both the information processing apparatus 300 according to the third embodiment and the information processing apparatus 400 according to the fourth embodiment are obtained. That is, the user can drag the input device 11 to switch between scrolling in the upward direction and scrolling in the downward direction. The user can drag the input device 11 to scroll the content and the user can press the input device 11 to perform upper scroll or lower scroll at a speed corresponding to the pressure, that is, the magnitude of the contacting pressure of the contacted object. Thus, the user can scroll to the upper side and the lower side with one finger, and can control the speed of scrolling by the pressing force. Therefore, the operability can be further enhanced with the information processing apparatus 600 according to the present embodiment than the information processing apparatus 300 according to the third embodiment and the information processing apparatus 400 according to the fourth embodiment.

Seventh Embodiment

Figure 24:
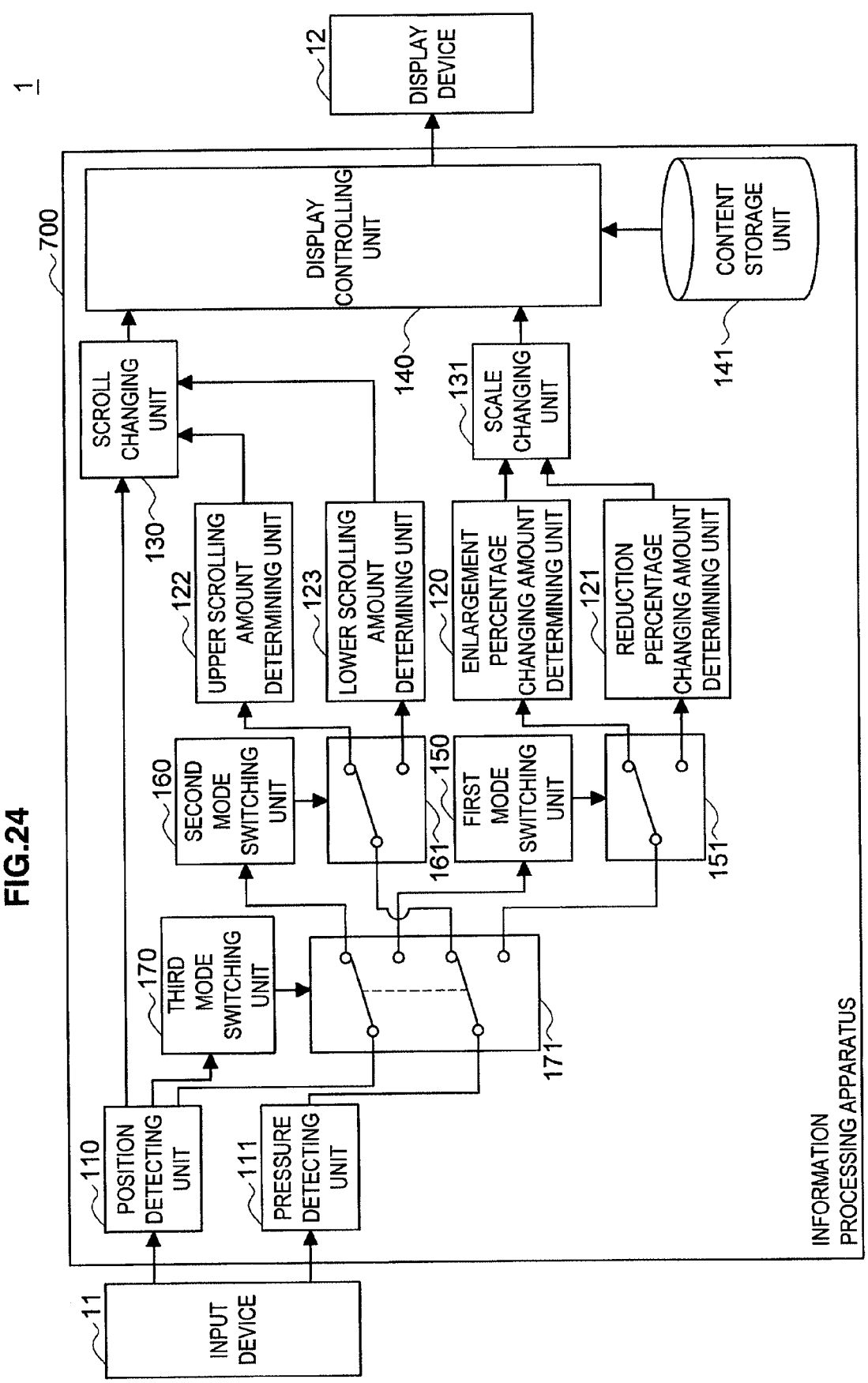
FIG. 24 is an explanatory view for explaining a configuration of an information processing apparatus according to a seventh embodiment of the present invention.
Figure 25:
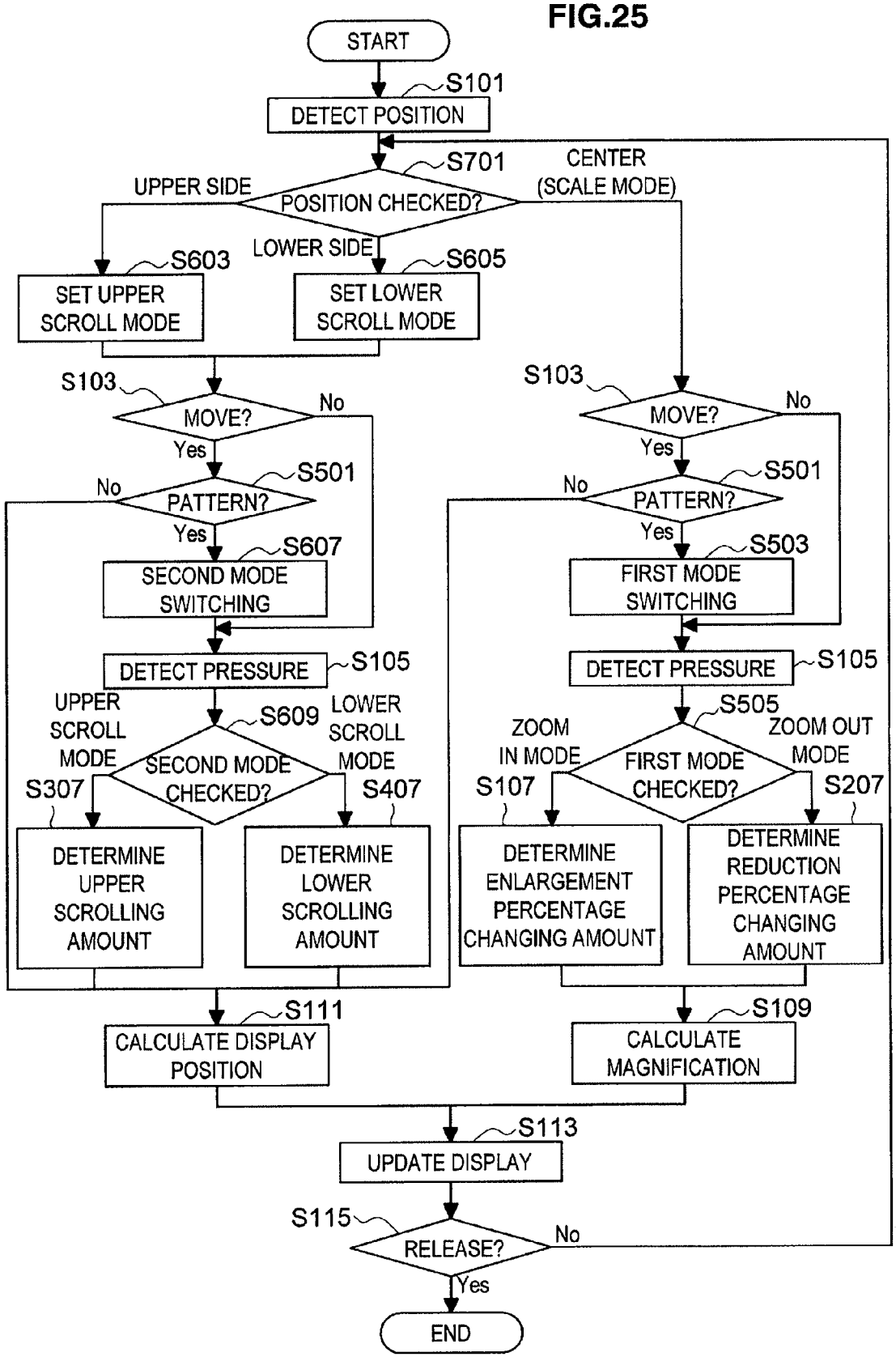
FIG. 25 is an explanatory view for explaining an operation of the information processing apparatus according to the embodiment.

An information processing apparatus according to a seventh embodiment of the present invention will now be described with reference to FIGS. 24 and 25. FIG. 24 is an explanatory view for explaining a configuration of the information processing apparatus according to the present embodiment. FIG. 25 is an explanatory view for explaining an operation of the information processing apparatus according to the present embodiment. The information processing apparatus 500 according to the fifth embodiment switches the mode (first mode) of scaling, and the information processing apparatus 600 according to the sixth embodiment switches the mode (second mode) of scrolling. The information processing apparatus according to the present embodiment can switch whether to zoom-in or zoom-out, or whether to scroll to the upper side or the lower side according to the magnitude of the contacting pressure.

As shown in FIG. 24, an information processing apparatus 700 according to the present embodiment has a configuration of the information processing apparatus 500 according to the fifth embodiment and the configuration of the information processing apparatus 600 according to the sixth embodiment, and furthermore, a third mode switching unit 170 and a third switching unit 171. Other configurations of the information processing apparatus 700 according to the present embodiment are the same as the other configurations of the information processing apparatus 500 according to the fifth embodiment.

The third mode switching unit 170 switches the mode (third mode) for determining whether to perform scaling or to perform scrolling. That is, the third mode switching unit 170 switches between a scale mode (one example of magnification mode) of changing the display magnification of the content and the scroll mode (one example of movement mode) of scrolling the content. In this case, the third mode switching unit 170 performs mode switching based on the contacting position detected by the position detecting unit 110.

One example of the contacting position for causing mode switching is as described below.

One example of the contacting position for causing mode switching is shown in FIG. 23. That is, the scale mode is set if the contacting position of the contacted object on the touch screen is the center area AC of the input device 11, and the scroll mode is set if the contacting position is the upper area AU or the lower area AL of the input device 11.

The third switching unit 171 is controlled by the third mode switching unit 170. The third switching unit 171 switches whether to output the signal representing the contacting position from the position detecting unit 110 to the first mode switching unit 150 and to output the pressure signal from the information pressure detecting unit 111 to the first mode switching unit 151, or to output the signal representing the contacting position from the position detecting unit 110 to the second mode switching unit 160 and to output the pressure signal from the information pressure detecting unit 111 to the second mode switching unit 161. The third switching unit 171 outputs the signal representing the contacting position to the first mode switching unit 150 and outputs the pressure signal to the first switching unit 151 when set to the scale mode. The third switching unit outputs the signal representing the contacting position to the second mode switching unit 160 and outputs the pressure signal to the second switching unit 161 when set to the scroll mode.

Therefore, the information processing apparatus 700 can switch between scaling and scrolling by including the third mode switching unit 170 and the third switching unit 171.

(Operation)

The operation of the information processing apparatus 700 according to the present embodiment will now be described with reference to FIG. 25. The operation of the information processing apparatus 700 is basically the same as the operation of the information processing apparatus 500 according to the fifth embodiment or the information processing apparatus 600 according to the sixth embodiment. However, the process of step S701 is performed after the process of step S101 shown in FIG. 19 or FIG. 22. The process of step S701 is performed in place of step S601 shown in FIG. 22.

That is, the process of step S701 is performed after the position detecting unit 110 of the information processing apparatus 100 detects the contacting position of the contacted object in step S101. In step S701, the second mode switching unit 160 and the third mode switching unit 170 check the contacting position of the contacted object.

The third mode switching unit 170 switches the mode to the scale mode when the contacting position is the center area AC of the input device, and proceeds to the next step S103 (step S103 on right side of FIG. 25). The operations after step S103 are the same as the operations shown in FIG. 19.

The third mode switching unit 170 switches the mode to the scroll mode when the contacting position is in the upper area AU or the lower area AL of the input device 11. More specifically, the second mode switching unit 160 switches the mode to the upper scroll mode when the contacting position is in the upper area AU of the input device 11, and proceeds to the next step S103 (step S103 on the left side of FIG. 25). The second mode switching unit 160 switches the mode to the lower scroll mode when the contacting position is in the lower area AL of the input device 11, and proceeds to the next step S103 (step S103 on the left side of FIG. 25). The operations after step S103 are the same as the operations shown in FIG. 22.

Representing the switching operation of the mode (third mode) for determining whether to perform scaling or whether to perform scrolling by the user in the case of the information processing apparatus 700 according to the present embodiment, FIG. 23 is obtained.

In other words, as shown in FIG. 23, when the contacted object contacts the touch screen at the position of the symbol T2U, that is, when the contacted object contacts the upper area AU of the input device 11, step S701 is processed and the scroll mode is set, and furthermore, step S603 is processed and the upper scroll mode is set. When the contacted object contacts the lower area AL of the input device 11, step S701 is processed and the scroll mode is set, and step S603 is processed and the lower scroll mode is set. When the contacted object contacts the touch screen at the center area AC of the input device, step S701 is processed, and the scale mode is set.

The operations after set to each mode are the same as the operations of the information processing apparatus 500 according to the fifth embodiment or the information processing apparatus 600 according to the sixth embodiment, and thus detailed description will be omitted.

(Example of Effects)

The information processing apparatus 700 according to the present embodiment has been described. According to such information processing apparatus 700, the effects of both the information processing apparatus 500 according to the fifth embodiment and the information processing apparatus 600 according to the sixth embodiment are obtained. That is, the user can switch between the scale mode and the scroll mode depending on the position to touch the input device 11. The user can thus perform scrolling and scaling with the operation of one finger, and the operability can be further enhanced than the information processing apparatus 500 according to the fifth embodiment and the information processing apparatus 600 according to the sixth embodiment.

It should be understood by those skilled in the art that various modifications, combinations, sub-combinations and alterations may occur depending on design requirements and other factors insofar as they are within the scope of the appended claims or the equivalents thereof.

For instance, a case where the information processing apparatus according to each embodiment is applied to the PDA 1 (see FIG. 1) has been described. However, the equipment to be applied with the information processing apparatus according to each embodiment is not limited to the PDA 1.

Figure 26:
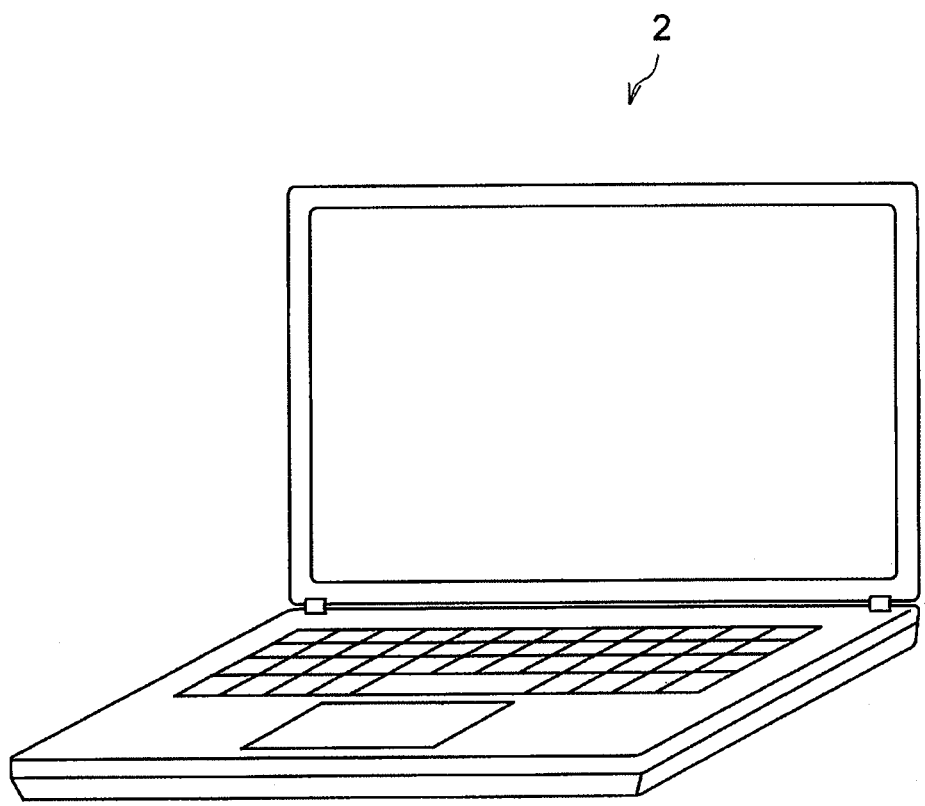
FIG. 26 is an explanatory view for explaining another example of an equipment to be applied with each embodiment of the present invention.

The information processing apparatus according to each embodiment may be applied to a computer 2 as shown in FIG. 26. In this case, a touch pad of the computer 2 is used for the input device 11, and a monitor of the computer 2 is used for the display device 12. That is, the input device 11 and the display device 12 may be formed as separate bodies, different from each embodiment described above.

Figure 27:
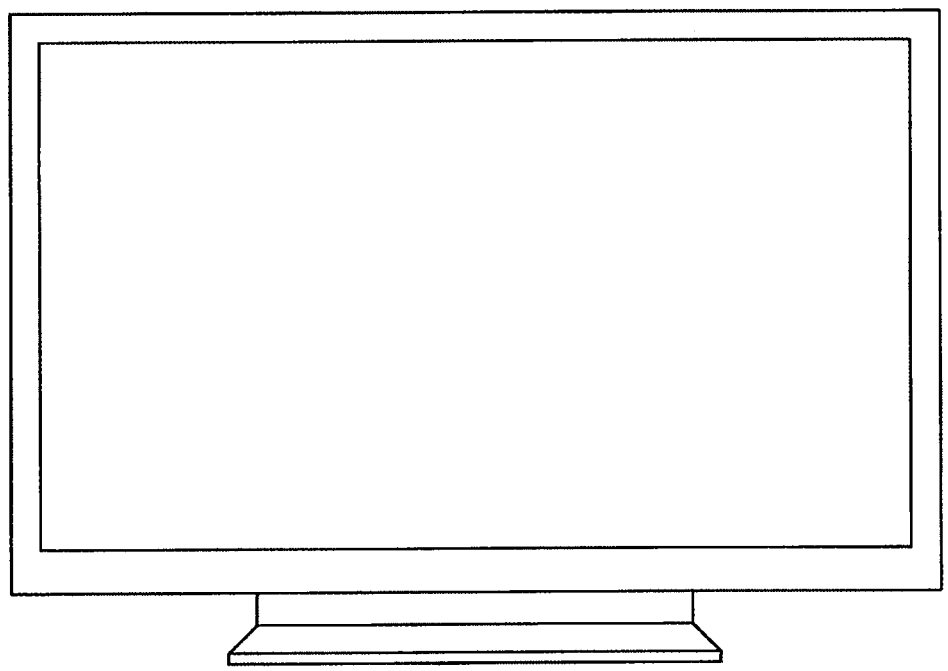
FIG. 27 is an explanatory view for explaining another example of an equipment to be applied with each embodiment of the present invention.

Furthermore, the information processing apparatus according to each embodiment may be applied to a television monitor 3 as shown in FIG. 27. In this case, the monitor may be formed as a touch screen (transparent contact sensor and pressure sensor may be arranged on the front surface of the monitor), and the input device 11 and the display device 12 may be integrally formed.

Figure 28:
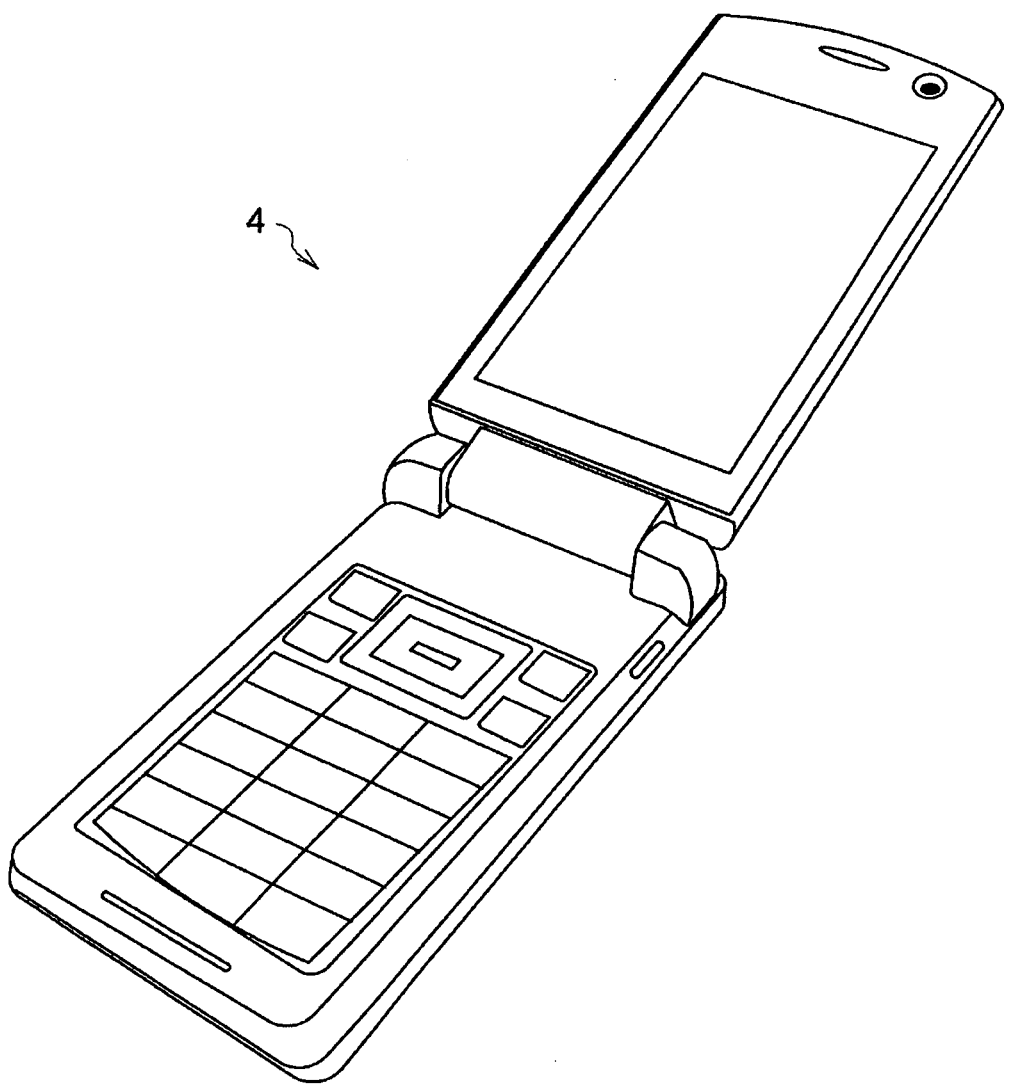
FIG. 28 is an explanatory view for explaining another example of an equipment to be applied with each embodiment of the present invention.

The information processing apparatus according to each embodiment may be applied to a portable telephone 4 as shown in FIG. 28. In this case as well, the monitor of the portable telephone 4 may be formed as a touch screen, and the input device 11 and the display device 12 may be integrally formed.

Figure 29:
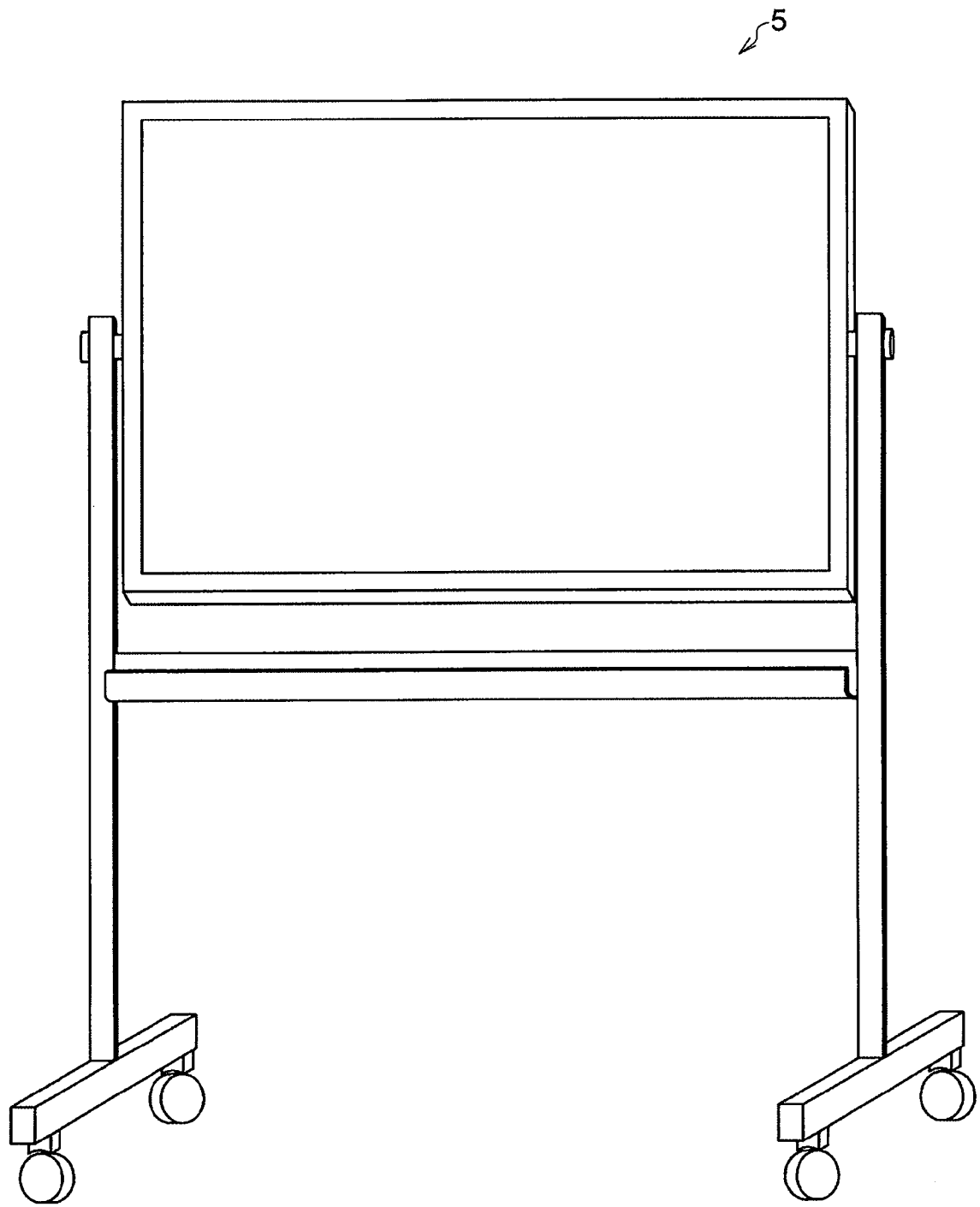
FIG. 29 is an explanatory view for explaining another example of an equipment to be applied with each embodiment of the present invention.

Moreover, the information processing apparatus according to each embodiment may be applied to a white board as shown in FIG. 29. In this case, the display device 12 may be arranged on the front surface of the white board and predetermined information may be displayed on the white board, and furthermore, the input device 11 may be arranged integrally with or as a separate body from the display device 12.

The drawings are shown here, and one example of an equipment to be applied with the information processing apparatus according to each embodiment has been described, but it is to be recognized that the information processing apparatus according to each embodiment is also applicable to various other equipments such as music reproduction device, projector, digital camera, digital video camera, game machine, electronic dictionary, and the like.

The direction of scrolling is described as up and down direction in the third embodiment, the fourth embodiment, the sixth embodiment, and the seventh embodiment, but the present invention is not limited such examples. If the content to be displayed on the display device 12 is a content that can be scrolled horizontally, the information processing apparatus can be formed similar to the third embodiment and the like with respect to scrolling in the left and right direction.

In the fifth embodiment through the seventh embodiment, the mode is switched when the trajectory of the movement of the contacting position of the contacted object detected by the position detecting unit 110 is a predetermined pattern (substantially circular), and the pattern is described as being all the same. However, the pattern of the trajectory of the movement of the contacting position of the contacted object used in mode switching may differ for every type of mode switching and every mode. For instance, the pattern used in switching between the zoom-in mode and the zoom-out mode and the pattern used in the switching between the upper scroll mode and the lower scroll mode may be different. Furthermore, the pattern used in switching to the zoom-in mode, the pattern used in switching to the zoom-out mode, the pattern used in switching to the upper scroll mode, and the pattern used in switching to the lower scroll mode may all be different from each other.

The series of processes described in each embodiment may be executed with a dedicated hardware, but may be executed with software. When performing the series of processes with software, the program is executed by a universal or a dedicated computer as shown in FIG. 30 to realize the series of processes.

FIG. 30 is an explanatory view for explaining a configuration example of a computer for realizing the series of processes by executing the program. The execution of the program for performing the series of processes by the computer is as follows.

As shown in FIG. 30, the computer includes, for example, a CPU (Central Processing Unit) 802, a recording device such as an HDD (Hard Disc Drive) 803, a ROM (Read Only Memory) 804, and a RAM (Random Access Memory) 805, a communication device 807 capable of being connected to a network such as LAN (Local Area Network) and Internet, a drive 808 for reading and writing a removable recording medium 809 including a flexible disc, an optical disc such as various CDs (Compact Disc), MO (Magneto Optical) disc, DVD (Digital Versatile Disc), and the like, magnetic disc, and semiconductor memory, the input device 11, the display device 12, and the like, which are connected by way of a bus 801, an input/output interface 806, and the like.

The CPU 803 executes various processes according to the program recorded on a recording device, the program received via the network, or the program read from the removable recording medium 812, to realize the series of processes. In this case, the CPU 803 may perform various processes based on information and signals input from the input device 11 as necessary. The processing result may be recorded on the recording device or the removable recording medium 812, as necessary, displayed on the display device 12, or transmitted to the network.

In this specification, the steps described in the flowcharts obviously include processes performed in time-series along the described order, but also processes executed in parallel or individually even if not necessarily processed in time-series. The order of steps processed in time-series may be appropriately changed in some cases.

What is claimed is:
1. An information processing apparatus comprising:
circuitry configured to:
detect a magnitude of a contacting pressure of a contacted object with respect to an input device operated when physically contacted by the contacted object;
detect positions of the contacted object with respect to the input device;
detect a predetermined magnification pattern formed by a predetermined movement trajectory comprised of a plurality of continuous different positions of the contacted object detected by the circuitry;
start a first mode of either an enlargement mode or a reduction mode of a display magnification of predetermined information to be displayed on a display device in response to the detecting of the predetermined magnification pattern;
in the first mode, switch between the enlargement mode and the reduction mode in response to the detecting of the predetermined magnification pattern;
in the first mode, identify whether the started first mode is the enlargement mode or the reduction mode;
in the first mode, change, upon determination that the detected magnitude of contacting pressure is above a predetermined threshold greater than zero and a contacting position of the contacted object is not moving after the first mode has been set, a display region displayed on the display device of the predetermined information to be displayed on the display device by changing the display magnification of the predetermined information by either enlarging, in a case the first mode is identified to be the enlargement mode, or reducing, in a case the first mode is identified to be the reduction mode, the display magnification according to an output signal output from the input device at a speed corresponding to the magnitude of the contacting pressure detected by the circuitry;
increase a speed of enlarging, in the case the first mode is identified to be the enlargement mode, or reducing, in the case the first mode is identified to be the reduction mode, the display magnification of the predetermined information according to an increase in the magnitude of the contacting pressure detected by the circuitry; and
change, upon determination that the detected magnitude of contacting pressure is below the predetermined threshold and the contacting position of the contacted object is moving, the display region by moving a display range of the predetermined information without changing the display magnification of the predetermined information.

2. The information processing apparatus according to claim 1, wherein the circuitry is configured to increase a speed of moving the display range according to an increase in the magnitude of the contacting pressure detected by the circuitry when moving the display range of the predetermined information.

3. The information processing apparatus according to claim 2, wherein the circuitry is configured to switch a scrolling direction from one direction to another direction in response to detecting a predetermined scroll pattern formed by the positions of the contacted object detected by the circuitry.

4. The information processing apparatus according to claim 1, wherein the circuitry is configured to switch between a scrolling mode and a scaling mode in response to detecting corresponding positions detected by the circuitry.

5. An information processing method comprising:
  detecting a magnitude of a contacting pressure of a contacted object with respect to an input device operated by being physically contacted by the contacted object;
  detecting positions of the contacted object with respect to the input device;
  detecting a predetermined magnification pattern formed by a predetermined movement trajectory comprised of a plurality of continuous different positions of the contacted object;
  starting, using circuitry, a first mode of either an enlargement mode or a reduction mode of a display magnification of predetermined information to be displayed on a display device in response to the detecting of the predetermined magnification pattern;
  in the first mode, switching between the enlargement mode and the reduction mode in response to the detecting of the predetermined magnification pattern;
  in the first mode, identifying, using the circuitry, whether the started first mode is the enlargement mode or the reduction mode;
  in the first mode, changing, using the circuitry, upon determination that the detected magnitude of contacting pressure is above a predetermined threshold greater than zero and a contacting position of the contacted object is not moving after the first mode has been set, a display region displayed on the display device of the predetermined information to be displayed on the display device by changing the display magnification of the predetermined information by either enlarging, in a case the first mode is identified to be the enlargement mode, or reducing, in a case the first mode is identified to be the reduction mode, the display magnification according to an output signal output from the input device at a speed corresponding to the magnitude of the detected contacting pressure;
  increasing, using circuitry, a speed of enlarging, in the case the first mode is identified to be the enlargement mode, or reducing, in the case the first mode is identified to be the reduction mode, the display magnification of the predetermined information according to an increase in the detected magnitude of the contacting pressure; and
  changing, using the circuitry, upon determination that the detected magnitude of contacting pressure is below the predetermined threshold and the contacting position of the contacted object is moving, the display region by moving a display range of the predetermined information without changing the display magnification of the predetermined information.

6. A non-transitory computer readable storage medium having instructions stored therein, which when executed by a processor in an information processing apparatus causes the processor to execute a method comprising:
  detecting a magnitude of a contacting pressure of a contacted object with respect to an input device operated by being physically contacted by the contacted object;
  detecting positions of the contacted object with respect to the input device;
  detecting a predetermined magnification pattern formed by a predetermined movement trajectory comprised of a plurality of continuous different positions of the contacted object;
  starting a first mode of either an enlargement mode or a reduction mode of a display magnification of predetermined information to be displayed on a display device in response to the detecting of the predetermined magnification pattern;
  in the first mode, switching between the enlargement mode and the reduction mode in response to the detecting of the predetermined magnification pattern;
  in the first mode, identifying whether the started first mode is the enlargement mode or the reduction mode;
  in the first mode, changing, upon determination that the detected magnitude of contacting pressure is above a predetermined threshold greater than zero and a contacting position of the contacted object is not moving after the first mode has been set, a display region displayed on the display device of the predetermined information to be displayed on the display device by changing the display magnification of the predetermined information by either enlarging, in a case the first mode is identified to be the enlargement mode, or reducing, in a case the first mode is identified to be the reduction mode, the display magnification according to an output signal output from the input device at a speed corresponding to the magnitude of the detected contacting pressure;
  increasing a speed of enlarging, in the case the first mode is identified to be the enlargement mode, or reducing, in the case the first mode is identified to be the reduction mode, the display magnification of the predetermined information according to an increase in the detected magnitude of the contacting pressure; and
  changing, upon determination that the detected magnitude of contacting pressure is below the predetermined threshold and the contacting position of the contacted object is moving, the display region by moving a display range of the predetermined information without changing the display magnification of the predetermined information.

7. The information processing apparatus according to claim 1, wherein, for a single continuous input operation, the circuitry detects a time change of the magnitude of the contacting pressure and change the display magnification of the predetermined information based on the time change of the magnitude of the contacting pressure.

8. The information processing apparatus according to claim 1, wherein the circuitry is configured to switch a scrolling direction from one direction to another direction in response to detecting a predetermined scroll pattern formed by the positions of the contacted object detected by the circuitry, wherein
  the predetermined magnification and scroll patterns are the same.

9. The information processing apparatus according to claim 1, wherein the circuitry is configured to switch a scrolling direction from one direction to another direction in response to detecting a predetermined scroll pattern formed by the positions of the contacted object detected by the circuitry, wherein
  the predetermined magnification and scroll patterns are different.

10. The information processing apparatus according to claim 1, wherein the circuitry is configured to switch a scrolling direction to a first direction in response to detecting a first predetermined scroll pattern formed by the positions of the contacted object detected by the circuitry and to switch the scrolling direction to a second direction in response to detecting a second predetermined scroll pattern formed by the positions of the contacted object detected by the circuitry, wherein
  the first and second predetermined scroll patterns are the same.

11. The information processing apparatus according to claim 1, wherein the circuitry is configured to switch a scrolling direction to a first direction in response to detecting a first predetermined scroll pattern formed by the positions of the contacted object detected by the circuitry and to switch the scrolling direction to a second direction in response to detecting a second predetermined scroll pattern formed by the positions of the contacted object detected by the circuitry, wherein the first and second predetermined scroll patterns are different.

12. The information processing apparatus according to claim 1, wherein:
   the circuitry is configured to switch to the enlargement mode in response to detecting a predetermined enlargement mode magnification pattern and to the reduction mode in response to detecting a predetermined reduction mode magnification pattern, and
   the predetermined enlargement and reduction mode magnification patterns are the same.

13. The information processing apparatus according to claim 1, wherein:
   the circuitry is configured to switch to the enlargement mode in response to detecting a predetermined enlargement mode magnification pattern and to the reduction mode in response to detecting a predetermined reduction mode magnification pattern, and
   the predetermined enlargement and reduction mode magnification patterns are different.

14. The information processing apparatus according to claim 1, wherein the predetermined movement trajectory is substantially circular.

* * * * *